US012151927B2

(12) United States Patent
Decker

(10) Patent No.: US 12,151,927 B2
(45) Date of Patent: Nov. 26, 2024

23

(54) SYSTEM FOR CUSTOMIZED FORMULATION AND PRODUCTION OF CLEANING PRODUCTS AND ASSOCIATED METHODS

(71) Applicant: Stephen E. Decker, Los Altos, CA (US)

(72) Inventor: Stephen E. Decker, Los Altos, CA (US)

(73) Assignee: Stephen E. Decker, Los Altos, CA (US)

( * ) Notice: Subject to any disclaimer, the term of this patent is extended or adjusted under 35 U.S.C. 154(b) by 0 days.

(21) Appl. No.: 17/087,784

(22) Filed: Nov. 3, 2020

(65) Prior Publication Data

US 2021/0130152 A1 May 6, 2021

Related U.S. Application Data

(60) Provisional application No. 62/931,716, filed on Nov. 6, 2019.

(51) Int. Cl.

| | |
|---|---|
| ***B67D 3/00*** | (2006.01) |
| ***B01F 33/84*** | (2022.01) |
| ***B67C 3/02*** | (2006.01) |
| *B01F 101/00* | (2022.01) |

(52) U.S. Cl.

CPC .......... *B67D 3/0003* (2013.01); *B01F 33/846* (2022.01); *B67C 3/023* (2013.01); *B67D 3/0012* (2013.01); *B67D 3/0077* (2013.01); *B01F 2101/4505* (2022.01)

(58) Field of Classification Search

CPC ........... B01F 2215/0077; B01F 33/846; B67D 3/0003; D06F 39/022

See application file for complete search history.

(56) References Cited

U.S. PATENT DOCUMENTS

| | | | | |
|---|---|---|---|---|
| 8,977,389 | B2 * | 3/2015 | Witchell | B01F 13/1069 700/233 |
| 2001/0049846 | A1 * | 12/2001 | Guzzi | D06F 34/22 8/158 |
| 2002/0150198 | A1 | 10/2002 | Thompson et al. | |
| 2004/0020723 | A1 * | 2/2004 | Schuman | B67D 7/02 186/52 |
| 2006/0272360 | A1 * | 12/2006 | Hsu | A47L 15/4454 68/19 |

(Continued)

OTHER PUBLICATIONS

Search Report and Written Opinion for PCT Application No. PCT/US20/58767 mailed Mar. 2, 2021, 13 pages.

*Primary Examiner* — Elizabeth Insler

(74) *Attorney, Agent, or Firm* — Perkins Coie LLP; Andrew T. Pettit

(57) ABSTRACT

Introduced here are systems for customized formulation and production of cleaning products and associated methods for using those systems. A system may include a computer-implemented platform (also referred to as a "formulation platform" or "production platform") that is communicatively connected to an interactive dispensing machine responsible for making cleaning products. An individual or company may be permitted to select, create, or modify formulas via the production platform, while the interactive dispensing machine can produce cleaning products in accordance with those formulas.

20 Claims, 10 Drawing Sheets

(56) References Cited

U.S. PATENT DOCUMENTS

| | | | | |
|---|---|---|---|---|
| 2007/0044820 | A1 | 3/2007 | Chan et al. | |
| 2010/0155415 | A1* | 6/2010 | Ashrafzadeh | F25C 5/22<br>62/340 |
| 2013/0092704 | A1 | 4/2013 | Tincher et al. | |
| 2017/0004558 | A1 | 1/2017 | Abramowitz | |
| 2019/0292710 | A1* | 9/2019 | Cooke | C11D 3/40 |

* cited by examiner

SYSTEM FOR CUSTOMIZED FORMULATION AND PRODUCTION OF CLEANING PRODUCTS AND ASSOCIATED METHODS

CROSS-REFERENCE TO RELATED APPLICATIONS

This application claims priority to U.S. Provisional Application No. 62/931,716 filed on Nov. 6, 2019, which is incorporated herein by reference in its entirety.

TECHNICAL FIELD

Various embodiments concern customized production of cleaning products, such as laundry detergents, based on characteristics of customers and/or the local area where the products are both produced and/or used.

BACKGROUND

Cleaning products (also referred to as "cleaning agents") are substances that are used to remove dirt, dust, stains, smells, and the like from surfaces. Historically, these substances have been available in the form of liquids, sprays, powders, granules, and unit-dose depending on the nature of the cleaning products.

One example of a cleaning product is laundry detergent. In 2018, the total market for laundry detergent (or simply "detergent") in the United States was approximately $7.3 billion. See "Laundry detergent dollar sales in the United States in 2018, by product category" available from Statista at https://www.statista.com/statistics/501875/us-laundry-detergent-dollar-sales-category/. The vast majority of this market—roughly 72.8 percent or $5.4 billion—was from the sale of liquid laundry detergent. Moreover, it is estimated that Americans wash about 29 billion loads of laundry each year. See "Laundry Care in the US" available from Euro-Monitor International at https://www.euromonitor.com/laundry-care-in-the-us/report. Thus, roughly 21.4 billion loads of laundry are likely washed with liquid detergent each year.

Liquid detergent is normally stored and transported in plastic containers, and the environmental impact of this approach is significant. Since the a commonly available plastic container contains 50 ounces of liquid detergent for 32 loads of laundry, those 21.4 billion loads of laundry translates into approximately 669 million plastic containers. The most commonly available plastic container is 10 inches in height and 125 grams (0.25 pounds) in weight. If all of the plastic containers used for liquid detergent in a year were stacked on top of one another, those containers would reach more than 105,500 miles into space. That's nearly half way to the moon, or enough to circle Earth about 4.2 times.

While the actual amount of liquid detergent and plastic containers may vary from year to year, there are still a staggering number of plastic containers that are manufactured (and then disposed of) each year for liquid laundry detergent. While roughly 30 percent of these plastic containers are recycled, the remaining 70 percent weigh a combined 167.25 million pounds. See "Ditch the Laundry Jogs and Go Plastic-Free" by K. Martinko that is available at https://www.treehugger.com/ditch-laundry-jugs-and-go-plastic-free-4858737. This huge amount of plastic ultimately ends up in landfills, oceans, and waterways.

The manufacture of polyethylene terephthalate (PET) (also referred to as "polyester") generates three pounds of carbon dioxide ($CO_2$) gas for every one pound of plastic that is produced. As such, the manufacture of those 669 million plastic containers—if manufactured from PET—will result in the release of roughly 55.7 million pounds of $CO_2$ gas. In short, the environmental impact of these plastic containers is massive, and any approach that reduces the number of plastic containers that are produced would have a notable positive impact.

Environmental impacts are not limited to manufacture of those plastic containers, however. Once a plastic container is manufactured, it needs to be filled and then shipped to a destination. Traditionally, liquid detergent is produced in large volumes at manufacturing facilities, loaded into plastic containers, and then delivered by truck through distribution centers to retail stores or homes (e.g., via e-commerce delivery services). As further discussed below, the main ingredient of liquid detergent is water, and a gallon of water weighs about eight pounds. As a result, a considerable amount of labor and energy is expended moving liquid detergent through the distribution system.

Consider the following:

Each load of liquid detergent is approximately 1.4 fluid ounces (41.40 milliliters);

The density of liquid detergent is approximately 0.885 grams per milliliter (g/ml), so each load of liquid detergent weighs approximately 36.64 grams (0.08 pounds); and Roughly 21.1 billion loads of laundry—i.e., 72.8 percent of 29 billion annual loads—involve liquid laundry detergent.

Given these assumptions, those 21.1 billion loads of laundry will use liquid detergent that weighs an estimated 2,342,645,877 pounds or 1,171,232 tons. As noted above, liquid detergent has historically been produced at a manufacturing facility and shipped to distribution centers and then reshipped to retail stores. Assuming an average trucking distance of 1,200 kilometers (km) (745.64 miles) and a conservative $CO_2$ emission rate of 80 grams per ton per kilometer, then shipping liquid detergent in the United States results in the emission of almost 250 million pounds of $CO_2$ into the atmosphere each year.

When the environmental impacts of production and transportation are combined, liquid detergent has a sizable impact on the environment. The industry creates nearly 670 million plastic containers and 300 million pounds of $CO_2$, and requires the consumption of millions of gallons of fuel each year. Any approach that reduces the environmental impact of liquid laundry detergent, and cleaning products more generally, would be desirable.

Figure 1:
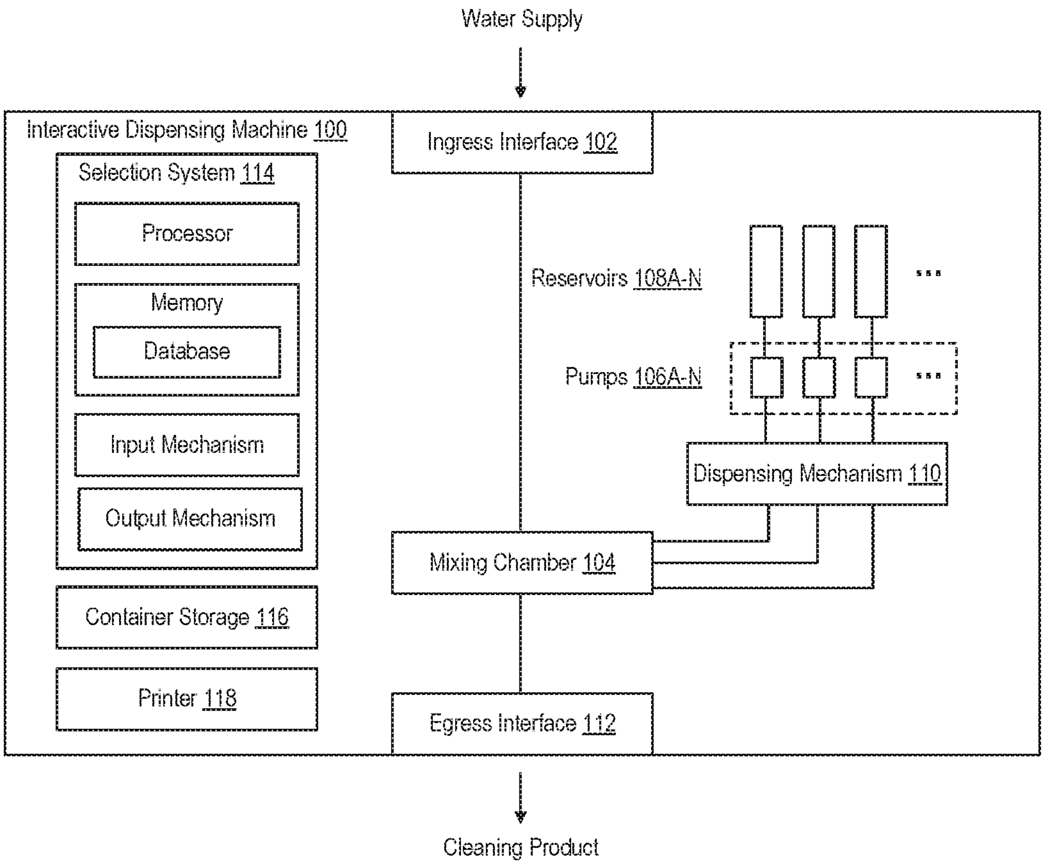
FIG. 1 includes a high-level illustration of an interactive dispensing machine in accordance with some embodiments.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Introduced here are systems for customized formulation and production of cleaning products and associated methods for using those systems. A system may include a computer-implemented platform (also referred to as a "formulation platform" or "production platform") that is communicatively connected to an interactive dispensing machine responsible for making cleaning products. An individual may be permitted to select, create, or modify formulas via the production platform, while the interactive dispensing machine can produce cleaning products in accordance with those formulas.

For example, an individual may wish to obtain liquid detergent having a feature such as extra stain removal or odor removal. In such a scenario, the individual may browse through formulas associated with the features that are accessible to the production platform. Alternatively, the individual may specify the feature, in which case the production platform may identify appropriate formulas. Upon receiving input indicative of a selection of a formula, the production platform may instruct the interactive dispensing machine to produce the detergent in accordance with the formula. The resulting cleaning product might be dispensed as a liquid or as a dry product.

Such an approach has several advantages. First, individuals may be permitted to manually tailor formulas to their preferences through the production platform. For instance, an individual may be able to select a formula that is appropriate for high-efficiency washing machines (also referred to as "washers") and then specify that he/she would like the cleaning product to be produced from natural ingredients. In this situation, the production platform may alter the formula on behalf of the individual (e.g., by replacing non-natural ingredients in the formula with natural ingredients). Second, cleaning products produced by the interactive dispensing machine may be discharged directly into containers provided by the individuals responsible for initiating production of those cleaning products. For instance, when an individual selects a formula for production, the production platform may prompt the individual to specify whether a container is needed. If the individual specifies that he/she has a container, he/she may be prompted to specify the size of the container so that the production platform can determine how much cleaning product should be produced by the interactive dispensing machine. And third, formulas can be automatically tailored by the production platform based on other factors affecting quality of cleaning products produced by an interactive dispensing machine. For instance, a production platform could be configured to determine whether a formula should be altered based on a characteristic of the water to be used by an interactive dispensing machine to produce a cleaning product—or water locally that would be used by the individual's machine with the cleaning product created.

As further discussed below, the production platform is embodied as a computer program that is executing on the interactive dispensing machine in some embodiments. In such embodiments, the interactive dispensing machine may operate much like the Coca-Cola® Freestyle soda fountains that allow mixtures of different Coca-Cola branded products to be mixed and then individually dispensed. For example, individuals may be able to interface with the interactive dispensing machine via a graphical user interface (or simply "interface") shown on a touch-sensitive display. While embodiments may be described in the context of touch-sensitive displays, those skilled in the art will recognize that other types of input elements could be used instead of, or in addition to, touch-sensitive displays.

In other embodiments, the production platform is embodied as a computer program that is executing on an electronic device associated with an individual who wishes to produce a cleaning product. In such embodiments, the production platform can initiate communication with an interactive dispensing machine responsive to determining that the individual would like to produce the cleaning product. For example, upon determining that the individual has initiated the computer program, the production platform may identify interactive dispensing machines, if any, located within a given proximity. As another example, the production platform may prompt the individual to specify his/her location (e.g., by entering a zip code) so that nearby interactive dispensing machines can be identified.

Embodiments may be described with reference to particular cleaning products, formulas, ingredients, arrangements of networked components, etc. However, those skilled in the art will recognize that these features are similarly applicable to other cleaning products, formulas, ingredients, arrangements of networked components, etc. For example, while embodiments may be described in the context of an interactive dispensing machine that produces laundry detergents, those skilled in the art will recognize that aspects of those embodiments may be similarly applicable to interactive dispensing machines that produce other types of cleaning products. As another example, embodiments may be described in the context of a production platform that resides on an electronic device that is connected to an interactive dispensing machine via a wireless communication channel. However, the relevant features may be similarly applicable to a production platform that resides on an interactive dispensing machine, or is distributed amongst an interactive dispensing machine and at least one electronic device.

While embodiments may be described in the context of computer-executable instructions, aspects of the technology can be implemented via hardware, firmware, or software. As an example, a set of algorithms designed to create and/or alter formulas for cleaning products based on input provided by individuals may be executed by a production platform. The production platform could be embodied as a computer program that offers support for reviewing, modifying, creating, and sharing formulas. In particular, the production platform may prompt a processor to execute instructions for receiving input indicative of an instruction to produce a cleaning product having a given feature with an interactive dispensing machine, obtaining a formula associated with the cleaning product, and causing the cleaning product to be produced by the interactive dispensing machine in accordance with the formula.

Terminology

References in this description to "an embodiment" or "one embodiment" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Accordingly, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, and/or hardware components. Modules are typically functional components that generate output(s) based on specified input(s). A computer program may include one or more modules. Thus, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Formulas for Cleaning Products

Cleaning products contain many ingredients, some of which have long, complicated names. As further discussed below, one of the main benefits of the technologies described herein is the ability to provide greater control of what is used to produce a cleaning product. For instance, individuals may be permitted to view complete lists of ingredients, as well as obtain more information regarding those ingredients, through the production platform.

A. Impact of Water

Cleaning products, such as liquid detergents, must be in a solution (i.e., dissolved in water) in order to work properly, so the chemistry of the water used to produce those cleaning products has an impact on effectiveness. As an example, the positively charged calcium and magnesium ions in hard water will interfere with the cleaning process by competing with the negatively charged surfactants in cleaning products, thereby impacting effectiveness. The hardness of water can be characterized based on the number of calcium and magnesium ions in the water. When liquid detergent is added to hard water, a portion of the liquid detergent will combine with the calcium and magnesium ions to form an insoluble salt that precipitates out of the solution. These particles will settle to the bottom of the washer without having done anything to clean the items loaded into the washer. Since over 85 percent of homes in the United States have hard water, this is a widespread issue. See "A Look at Hard Water Across the US" available at https://homewater101.com/articles/hard-water-across-us.

Sophisticated individuals may attempt to address the problems posed by hard water. For example, some individuals may research the water that will be used by the washer and then add substances, such as a water softener, to compensate for the hardness. But this approach is time consuming, an incremental cost, and prone to error. As further discussed below, the production platform can address this issue by creating and/or altering formulas for cleaning products based on hardness of the water with which the cleaning products are to be used.

B. Impact of pH

Similar to hardness, alkalinity is important to cleaning processes because cleaning products tend to work better under alkaline conditions. The term "pH" stands for "potential of hydrogen" and refers to the amount of hydrogen ions in a solution. A lower pH level indicates greater acidity, while a higher pH level indicates greater alkalinity. Alkalinity is a measure of the capacity of a solution (e.g., water) to resist a change in pH that would tend to make the solution more acidic. Note that the pH scale is logarithmic rather than linear. That is, a solution with a pH level of 8 is ten times more alkaline than a solution with a pH level of 7, and a solution with a pH of 6 is one-hundred times more acidic than a solution with a pH level of 8.

The normal range for pH level is 6.5-8.5 for surface water and 6.0-8.5 for ground water. Most stains are acidic in nature, so alkalinity will help to neutralize a stain and dislodge it from an item. Alkalinity also aids in keeping the resulting particles (e.g., of dirt, grit, grease, etc.) suspended in the wash water rather than redeposited onto the item. This is especially important in high-efficiency washers that require less water.

In general, higher alkalinity is better for cleaning. However, overly acidic or alkaline water can damage elastics and delicate fabrics, as well as make clothes appear dingy. Sophisticated individuals may attempt to compensate for pH level by adding substance(s) to the water. However, the vast majority of individuals are completely unaware of the impact of pH level on the cleaning process. As further discussed below, the production platform may create and/or alter formulas for cleaning products to account for the pH level of the water with which the cleaning products are to be used.

C. Impact of Fragrance

For many individuals, fragrance is an important part of the laundry experience. Some individuals choose liquid detergents based solely on smell. In fact, being clean is synonymous with smelling clean for some people. Gain® detergent, for example, competes with other detergents based on fragrance. Other people may find that the perfumes included in detergents cause skin irritation or another allergic reaction. For these people, choosing a fragrance-free option is critical.

Given its importance, fragrance is an aspect that individuals will want to choose, influence, or modify. As further discussed below, the production platform may allow individuals to vary the level of perfume (and thus the intensity of fragrance) in cleaning products or select/create new fragrances for cleaning products. There are many more fragrances than are presently used in cleaning products.

While detergents are available in different formulas with various fragrances, no detergent allows consumers to customize their fragrances in accordance with personal taste. Instead, consumers are forced to choose from a limited list of fragrances paired with their desired cleaning product.

D. Impact of Lifestyle

Individuals lead vastly different lives, and therefore have different requirements for their cleaning products. For example, those individuals that have jobs involving demanding physical labor or opt to workout frequently will sweat more than more sedentary individuals. Eccrine glands are located all over the human body. These glands release a salty liquid (referred to as "sweat") that is good for cooling but can become embedded in fabric fibers along with proteins. Bacteria and enzymes feed on these proteins and then produce gas as waste, which results in odor. Because articles of clothing worn while performing physical activities accumulate larger amounts of these proteins, these clothes will be "smellier" as a result.

Some ingredients in detergents inhibit certain enzymes from producing odor, thereby controlling odor in clothing. Some detergents offer specific formulas that are optimized for active lifestyles. For example, Tide® Plus Febreeze® Sport Active Fresh detergent is specifically formulated for individuals with active lifestyles. While this detergent is formulated to address this one need, it is formulated only for this one need. Consumers are limited with regard to other features, such as fragrance, septic friendliness, optical brightening agents, and the like. As further discussed below, the production platform can be used to create cleaning products that better suit the lifestyles of individuals. For instance, an individual may be permitted to select multiple features or specify multiple lifestyles. As an example, the individual may specify that he/she would like a cleaning product suitable for active lifestyles with a low level of fragrance.

In addition to the more generic eccrine glands, the human body also has apocrine glands that put out a milky substance that regulates sweating. These glands are mostly found underneath the arms and near the genitals. With the onset of puberty, teenagers experience many different changes including increases in hormones and changes in gland production. When teenagers enter puberty, the apocrine glands become very active. This effect dissipates as those individuals mature. As noted above, bacteria can feed on apocrine sweat, grow, multiply, and the produce waste that results in odor. It is the combination of bacteria and sweat from the apocrine glands that produces strong odors in the clothing of teenagers. Ingredients can be added to detergent to prevent certain enzymes from producing odor; however, no detergents are presently formulated for teenagers. Ideally, an individual could customize a detergent to incorporate these ingredients while washing clothes worn by a teenager.

Infant clothes also present unique laundry issues as a result of urine or fecal matter that was not captured by diapers. In addition, many parents have begun choosing reusable diapers (e.g., comprised of cloth) over disposable diapers. Odors in infant clothes, as well as diaper rash, are most likely caused by residual urine in clothes and reusable diapers that was not successfully washed away. Three common signs of urine residue are:

If the item smells like urine after being washed;

If the item smells clean after being washed but then immediately smells like ammonia when in contact with urine; and If the infant wearing the item frequently suffers from diaper rash, which is indicative that the ammonia in the item is burning the skin.

In the human body, ammonia is converted into urea and then excreted. Once urine is released, the urea begins converting back into ammonia, so some ammonia smell is normal. Residual urea and certain types of bacteria and enzymes increase the rate of conversion into ammonia. As such, if there is a strong smell of ammonia after an infant urinates, then there is likely residual urine in the clothes or reusable diaper.

Certain ingredients can be added to detergent to inhibit activity of enzymes that feed on residual urea and reduce odors in infant clothes. Some detergents, such as Dreft Stage 2® Active Baby detergent and Green Shield Organic Baby Free and Clear detergent are specifically formulated for families with infants. While some detergents are formulated to address this one need, these detergents are formulated only for this one need, thereby forcing consumers to purchase multiple detergents for different needs. As further discussed below, the production platform may permit individuals to create cleaning products that address multiple needs. For example, some seniors with bladder problems might want a detergent that helps reduce urine odor and has some other factor not present in infant-focused detergents.

Stains are another issue that impact the cleaning process. Parents with children, especially those that play outdoor sports, often battle stains from grass. Some fabrics, like those comprised of cotton, are especially good at binding dyes. Since grass is essentially made of organic pigments, the pigments in grass can bind to these fabrics at the molecular level in a similar manner to dyes, making them difficult to remove.

Cotton is a polysaccharide made of glucose units, with three hydroxyl (—OH) groups on each unit, meaning there are multiple sites for hydrogen bonding for the polar groups in dyes. Grass is made of carotenoids, such as xanthophylls, which are organic pigments. These pigments can transfer to clothes, especially those comprised of cotton, on contact. This phenomenon is similar to making a tie-dye shirt where the dyes affix to the cotton. At a molecular level, cotton treats grass as another dye, allowing the grass to create hydrogen bonds for the polar groups in dyes. Unlike the colors in the tie-dye shirt, however, the pigments in grass are not welcome additions to clothes. Enzymes can be added to detergent to help break down the structure of grass stains at the molecular level. In many cases, individuals rely on laundry additives to boost stain removal. For example, a second product (e.g., OxiClean stain remover) may be added to detergent during the cleaning process. Ideally, if an individual were to determine that additional product(s) are necessary, the detergent could be customized to include an additional ingredient(s).

Many individuals do not encounter any of the situations listed above. These individuals may simply commute to and from work without performing any physical activities that cause clothes to become dirty. As such, these individuals may need very few of the ingredients further discussed below. Instead, these individuals could use a simple, less-complex detergent with far fewer ingredients. The production platform may allow these individuals to discover which ingredients are actually necessary given their lifestyles (and possibly enjoy the corresponding cost savings from not including unnecessary ingredients).

In a similar vein, some geographic regions are known for stains. For example, individuals that live in Arizona may struggle with stains created by the red clay soil that is endemic to that region. As another example, individuals that live in Santa Barbara and Pacifica, California, may have their beachwear, towels, and swimwear stained with tar. As another example, individuals who work in restaurants in Kansas or South Carolina might encounter barbeque stains that are vastly different than individuals who work in restaurants in Texas due to the way that barbeque and sauces are made in those regions. Other geographic factors that could product unique stain types include plants, pollen, air pollutants, soil type, and other environmental elements. The production platform may allow individuals to customize cleaning products (e.g., to include appropriate surfactants or enzymes) as appropriate for their specific geographical region.

E. Impact of Ingredients

Some materials and types of garments have specific washing requirements. For example, clothes with elastic are harmed by bleach, and infant clothing and bedding cannot be treated with some fabric softeners without losing flame-retardant properties. Similarly, wicking materials commonly found in athletic clothes can be harmed by some ingredients, while towers can become hydrophobic and less absorbent when treated with some fabric softeners. As further discussed below, the production platform may permit individuals to customize cleaning products to minimize or eliminate these harmful effects to best optimize for personal needs.

Optical brightening agents (also referred to as "optical brighteners"), such as fluorescent brightening agents and fluorescent whitening agents, are chemical compounds that can be added to detergents. Optical brighteners absorb light in the ultraviolet and violet regions—usually 340-370 nanometers (nm)—of the electromagnetic spectrum and reemit light in the blue region—usually 420-470 nm—by fluorescence to enhance the appearance of color by causing a whitening effect.

Some individuals like how optical brighteners make clothes look, and these individuals seek our detergents with this ingredient. However, optical brighteners also pose a number of potential environmental and health problems. For example, optical brighteners do not biodegrade. As a result, optical brighteners can bioaccumulate into aquatic life, posing a potential hazard over an extended period of time. Moreover, optical brighteners can irritate individuals with allergies and increase sensitivity to ultraviolet light. While the relationship between optical brighteners and increased sensitivity to ultraviolet light is unclear at present, one study showed that the abrasive action of optical brighteners may increase sensitivity to natural sunlight. Optical brighteners also undergo photodegradation, meaning that they will be altered by sunlight. This process will produces metabolites, the effects of which are unclear. Optical brighteners are also highly visible using night vision technologies. As such, optical brighteners may be unsuitable for detergents used by hunters and members of the military.

Many individuals have begun seeking environmentally friendly detergents without synthetic dyes, perfumes, optical brighteners, phosphates, or other chemicals that are included in many detergents. These individuals might desire a natural, bridgeable, earth-friendly alternative. For example, individuals might want a detergent comprised of natural (e.g., plant-based) ingredients such as Seventh Generation® detergent. As further discussed, the production platform may enable individuals to customize their cleaning products so that natural ingredients are used instead of some or all of the traditional non-natural ingredients or exclude ingredients, such as optical brighteners.

High-efficiency washers use up to 80 percent less water than traditional washers. While this creates sizable water and energy savings, the decreased amount of water requires that the formula of the detergent be altered to account for low-water conditions, including adding anti-redeposit ingredients. When a high-efficiency washer detects excess suds after completing the first rinse cycle, the washer may add more rinse cycles. Some detergents produce too many suds, and if a low-suds detergent designed specifically for high-efficiency washers is not used, the washer can take 25 minutes or more to complete a single washing cycle. This means that incorrect detergent formulas can eliminate some or all of the water and energy savings promised by high-efficiency washers.

While there are many detergents that are formulated for high-efficiency washers, not all detergents are formulated for high-efficiency washers. Thus, some features (or combinations of features) might not be offered by detergents suitable for high-efficiency washers. As further discussed below, the production platform may allow individuals to customize cleaning products to incorporate some of the above-mentioned features while still being compatible with high-efficiency washers. Moreover, the production platform may enable individuals to customize cleaning products based on the manufacturer of the appliance with which those cleaning products are to be used. For example, a formula for a laundry detergent could be customized based on the manufacturer of a washer, and a formula for a dish detergent could be customized based on the manufacturer of a dishwasher.

Most homes release wastewater from household plumbing into a sewer line that transports the wastewater to a remote processing facility. However, more than 25 percent of homes in the United States use a septic system to locally process plumbing waste through deposition into a tank or field. Septic systems rely on "good" bacteria to break down solid plumbing waste. At a high level, a septic system will digest organic matter and separate floatable matter (e.g., oils and grease) and solids from wastewater.

Soil-based septic systems discharge the liquid (also referred to as "effluent") from the tank into a series of perforated pipes buried in a leach field, chambers, or another special unit designed to slowly release effluent into the soil. Other septic systems use pumps or gravity to help effluent trickle through sand, organic matter (e.g., peat or sawdust), constructed wetlands, or other media to remove/neutralize pollutants such as disease-causing pathogens, nitrogen, and phosphorus before the effluent is discharged into the soil.

Many individuals want to use the most effective cleaning products to keep their homes clean and free of germs. However, some of these cleaning agents are harmful to the bacteria that cause septic systems to work properly. Individuals whose homes have septic systems may have to limit the number of loads of laundry that are completed each week and seek out detergents with special ingredients. As further discussed below, the production platform may enable individuals to customize cleaning products to include ingredients that are friendly to septic systems, and therefore do not kill the "good" bacteria these septic systems require.

On a similar note, some homes recycle certain types of wastewater for reuse as part of a greywater system. For example, the wastewater from toilets may be processed separate from the wastewater from sinks, showers, and washers, which may be reclaimed and used to water landscaping. In such a scenario, an individual might want to ensure that detergent ingredients are environmentally friendly when diluted and appropriate for use in watering landscaping.

Different varieties of cleaning products will also have varying levels of ingredients and dilution. As further discussed below, the production platform may allow individuals to customize cleaning products to specify the ratio of ingredients and/or the total amount of water to be included.

Overview of Interactive Dispensing Machine

Introduced here is a dispensing machine with which individuals can interact to produce customized cleaning products. As further discussed below, the interactive dispensing machine may be designed to operate in concert with a production platform through which the individual is able to select, create, or modify formulas for cleaning products.

The interactive dispensing machine enables customized, localized production of cleaning products, such as laundry detergent, based on the specific needs of the consumers. Generally, the interactive dispensing machine includes a series of reservoirs of ingredients, a series of dispensing elements (e.g., pumps) configured to controllably dispense ingredients from the reservoirs into a mixing chamber to create a cleaning product, and a dispensing mechanism configured to controllably dispense the cleaning product through an egress interface. Some embodiments of the interactive dispensing machine also include a selection system through which individuals may be able to select, create, or modify formulas for cleaning products. For example, an individual may use the selection system to customize a formula, form, and specify the volume of cleaning product to be produced. Based on these inputs, the selection system can drive the dispensing elements so that appropriate amounts of the ingredients are dispensed. The final product could be dispensed in dry form, or the system could employ an ingress interface through which water is received, into the mixing chamber where those ingredients are mixed with water to produce a liquid cleaning product. Then, the cleaning product can be deposited into a container that is located in a dispensing area of the interactive dispensing machine.

When dispensed as a liquid, the product is immediately ready for use. If dispensed as dry granules, the consumer could keep the product in that form until ready for use and pour granules into, for example, a washing machine. Alternatively, the consumer could bring the container home, add water, and then shake to mix the ingredients to form a traditional liquid detergent.

The formula of the cleaning product can be customized, manually by the individually and/or automatically by the production platform, based on various factors. These factors can include the hardness or pH of the water used to produce the cleaning product, the hardness or pH of the water with which the cleaning product is to be used, desire for type and strength of fragrance, cleaning needs, environmental goals, type of item being cleaned, septic or sewer requirements, type of washer, or regional stain type, while allowing individuals to pay for only those ingredients that are needed.

Cleaning products (or simply "products") can be dispensed on demand to promote the reuse of existing containers. In addition to providing consumers with customized products at lower cost, retailers may gain significant benefits from the elimination of tasks associated with demand forecasting, product storing, shipping, and product stocking. Instead, retailers can focus on resupplying ingredients in the interactive dispensing machines. At the same time, everyone can benefit from the positive environmental impact derived from less fuel and shipping costs, as well as a reduction in the number of containers that are produced.

Finally, the interactive dispensing machine and production platform provide greater transparency for product formulation. Consumers will have a better idea of what, exactly, their cleaning products are made of. Moreover, the production platform may be representative of a place where consumers, experts, manufacturers, retailers, and other entities can explore, share, and publish formulas.

In some embodiments, each formula is stored in a database and assigned an identifier so that it can be easily identified, shared, etc. For example, a retailer in Phoenix, Arizona, might develop the following formula for a unique product for nearby residents:

[Product UFI A9F4BC2] Eco-Friendly Phoenix Teen Baseball Septic: A custom formula optimized for hardness and pH levels of Phoenix water to optimally clean clothes for a family with a sweaty teenager that plays baseball on Arizona red clay. This formula does not have optical brighteners, uses select plant-based ingredients, has a bacon fragrance, and is specifically formulated to be compatible with septic systems.

As another example, a retailer in Santa Barbara, California, might develop the following formula for a unique product for nearby residents:

[Product UFI B7E9AD3] Santa Barbara Oil Rig Worker Low Cost: A custom formula optimized for quality of water in Santa Barbara for a woman who works on an oil derrick whose coveralls are often stained by petroleum products and who wants to create an effective but inexpensive detergent.

These retailers can then invite individuals to bring empty containers (e.g., empty detergent bottles) that can be filled with the unique product at any interactive dispensing machine. Because these formulas can be easily shared, individuals outside of Phoenix and Santa Barbara could also be permitted to select these formulas.

Accordingly, the technologies described herein relate to the customized, localized production of cleaning products based on personal needs, water characteristics, and the like. Using these technologies, individuals can select, create, or modify formulas to accommodate for the local water supply (e.g., based on its hardness or pH), desired level of fragrance, or cleaning needs driven by family members or activities. Moreover, formulas may be selected, created, or modified to treat specific materials/items, address personal environmental goals, account for septic, sewer, or reclamation requirements, match the type of washer, or treat geography specific stains. Some or all of these can be interests can be addressed while still allowing individuals to have cleaning products produced on demand near their homes.

FIG. 1 includes a high-level illustration of an interactive dispensing machine 100 in accordance with some embodiments. The interactive dispensing machine 100 may include an ingress interface 102 through which water is supplied, an egress interface 112 through which cleaning product is dispensed, and a mixing chamber 104 fluidly connected between the ingress and egress interfaces 102, 112 in which the cleaning product is produced.

A selection system 114 can be used by an individual to create a unique formula from scratch, select an existing formula, or modify an existing formula to better suit the specific needs of the individual. The selection system 114 may also allow the individual to specify the volume of cleaning product to be dispensed. For example, the selection system 114 may allow the individual to specify the size of the container into which cleaning product will be dispensed.

As shown in FIG. 1, the selection system 114 can include an input mechanism with which the individual can provide input. Examples of input mechanisms include touch-sensitive displays and keypads for tactile input, microphones for audible input, scanners (e.g., for barcodes or Quick Response (QR) codes) for visual input, etc. The selection system 114 may also include an output mechanism for presenting information to inform the individual of options, selections, and state of production. One example of an output mechanism is a display. In embodiments where the interactive dispensing machine 100 includes a touch-sensitive display, the touch-sensitive display may serve as the input mechanism and output mechanism. Alternatively, the interactive dispensing machine 100 may include a display that is not touch sensitive and some other form of input mechanism. Individuals may use the selection system 114 to learn about the ingredients stored in the reservoirs 108A-N, the cost of each ingredient, the environmental impact of each ingredient, and the compatibility of different combinations of ingredients.

In some embodiments, the selection system 114 may offer a "service mode" in which authorized personnel can obtain information about health of the interactive dispensing machine 100, usage of the interactive dispensing machine 100, volume of ingredients in the reservoirs 108A-N, pH and hardness of the water flowing through the ingress interface 102, and other factors that would be useful in servicing the interactive dispensing machine 100. For example, the interactive dispensing machine 100 could include a communication module that is responsible for transmitting this information to a destination as further discussed with reference to FIG. 2.

As shown in FIG. 1, the selection system 114 may include a memory that includes a database. The database may record:

- Information about ingredients (e.g., those ingredients stored in the reservoirs 108A-N) such as their purpose;
- Cost per milliliter (ml) of each ingredient;
- Availability or supply of each ingredient;
- Compatibility of ingredients with other ingredients, including any harmful interactions;
- Approximate formula of competing detergents;
- Default formulas submitted via the Internet or by a third party;
- Formulas that were previously ordered by each individual;
- Current specials and promotions;
- Trends by location, region, or individual characteristic;
- Individual information such as name, email, zip code, and preferences;
- pH value of water available to the interactive dispensing machine or homes in a certain zip code; or
- Hardness of water available to the interactive dispensing machine or homes in a certain zip code.

All information regarding formulas may also be stored in the database. Each formula may be assigned a unique formula identifier (UFI) that uniquely identifies it amongst all formulas. The database may also include approximate formulas of popular detergents along with the appropriate Stock Keeping Unit (SKU) or Universal Product Code (UPC), thereby allowing the selection system 114 to recognize these products and specify the ingredients to be dispensed.

New formulas may be created using the selection system 114 residing on the interactive dispensing machine 100, or through a production platform residing on an electronic device associated with an individual as further discussed below. New formulas could be added by individuals, corporate entities such as manufacturers or retailers, or any other interested entity that desires to create a formula. Given the complexities involved, individuals may be guided through the formulation creation process. For example, an individual may be prompted to specify (e.g., via the input mechanism) the features that a new product should have. Then, the selection system 114 may recommend a formula based on those features, and the individual may be allowed to review/revise the recommended formula as he/she sees fit. Each new formula can be assigned a UFI by the selection system 114. Individuals may also be permitted to create names of products to help them more easily remember the intended use. For example, an individual may name different formulas as "Cindy's Hockey Uniform," "Remove Teenage Stink," and "Walgreens Summer Stain Fighter with Tropical Scent." In some embodiments these names are viewable by other individuals who subsequently browse the database, while in other embodiments these names are viewable only by the individual who created them.

The database may include information about the individuals responsible for creating and submitting formulas. Additionally, the database may include associations between formulas and consumer profiles, thereby enabling individuals to track the history of various versions of their custom formulas, as well as leave notes regarding perceived effectiveness, possible modifications, etc.

In some embodiments, information that is captured locally by the selection system 114 is only stored in the memory of the interactive dispensing machine 100. In such embodiments, individuals may only be able to select from formulas that have previously been uploaded to, created on, or used by the interactive dispensing machine 100. In other embodiments, information is captured locally by the selection system 114 and then stored in a remote memory accessible to the interactive dispensing machine 100 across a network. As further discussed below, the remote memory could be part of a network-accessible server system. In such embodiments, information in the database could be shared across an entire network of interactive dispensing machines. Such an approach would allow an individual or entity to publish a new formula that is available for purchase at any interactive dispensing machine 100. Alternatively, information could be distributed amongst the interactive dispensing machine 100 and network-accessible server system. For example, targeted formulas (e.g., those designed for individuals who live near the interactive dispensing machine 100) may be stored on the interactive dispensing machine 100 while more general formulas may be stored on the network-accessible server system.

Generally, the interactive dispensing machine 100 includes a series of reservoirs 108A-N in which ingredients are stored in either dry or liquid form and a series of pumps 106A-N are used for the controlled dispensing the ingredients. While the embodiment shown in FIG. 1 includes a series of pumps 106A-N, those skilled in the art will recognize that other dispensing elements (also referred to as "dispensers") could be used. As shown in FIG. 1, each reservoir may be associated with a pump responsible for controllably dispensing the corresponding ingredient. Alternatively, a single pump could be associated with multiple reservoirs. For example, more popular ingredients may be stored in more than one reservoir. In some embodiments, the interactive dispensing machine 100 includes a series of sensors to detect the quantity of ingredients in the reservoirs 108A-N. These sensors could be, for example, optical sensors arranged to detect the surfaces of the ingredients in the reservoirs 108A-N. The selection system 114 (and, more specifically, its processor) may be able to infer how much of each ingredient is left based on the readings generated by the sensors. The processor may also be able to transmit information regarding these readings to a destination (e.g., the network-accessible server system) to facilitate refilling/replacement of the reservoirs, as well as addition of new ingredients not presently offered by the interactive dispensing machine 100.

As noted above, if required, water may enter the interactive dispensing machine 100 through an ingress interface 102 that is fluidly connected to a source. Generally, the source is a water line connected to the municipal water supply. However, in some embodiments, the source is a storage tank that is periodically refilled. As further discussed below, the interactive dispensing machine 100 may be able to measure and analyze water properties, such as hardness or pH, to aid in the proper formation of cleaning products.

If a liquid product is being dispensed, after a formula has been selected/created by the individual through the selection system 114, the dispensing mechanism 110 can combine the appropriate ingredients from the reservoirs 108A-N along with water in the mixing chamber 104 to create the corresponding cleaning product. The dispensing mechanism 110 may include a controller that is responsible for controlling the pumps 106A-N shown in FIG. 1. Alternatively, the controller may simply control digital valves located along one end of the reservoirs 108A-N to dispense the ingredients. Controllers are a common component in industries where accurate, reliable dispensing of ingredients is needed, such as pharmaceutical manufacturing, industrial fabrication, etc. Examples of manufacturers of computer-controlled digital valves include ThermoFisher Scientific, Fishman Corporation, and GPD Precision Dispensing Systems.

When a liquid product is being dispensed, the ingredients are mixed with the water in the mixing chamber 104 before being dispensed through the egress interface 112. This may be done to ensure that the ingredients are properly mixed in a more controlled environment. For example, ingredients may be controllably dispensed from the reservoirs 108A-N using the pumps 106A-N into the mixing chamber 104 and then subjected to a mixing operation. The mixing operation may be performed by a mixing mechanism, such as a paddle, mixer, impeller, rotating blade, etc. Alternatively, tubes along which the ingredients flow (e.g., from the pumps 106A-N to the mixing chamber 104) may be designed to promote mixing. For example, these tubes may have geometric features (e.g., protrusions or indentations) or designs (e.g., convergent or divergent tapering) that promote improved mixing. Other embodiments of the interactive dispensing machine 100 may not include a mixing chamber. In such embodiments, the ingredients could be dispensed in such a manner that the cleaning product is formed as the ingredients are dispensed into the container positioned near the egress interface 112.

In another embodiment, some or all ingredients may be stored and dispensed in a granular/dry form. This would negate the need for a source of water to be available for the water machine to operate.

As shown in FIG. 1, the interactive dispensing machine 100 may include a printer 118. Alternatively, the interactive dispensing machine 100 may be connected to the printer 118 (e.g., via a wired or wireless communication channel). The printer 118 may be responsible for printing labels following the production of cleaning products. Each label may include:

The UFI of the formula;

The name or title of the formula;

The price;

Dosing and storage instructions;

A general list of ingredients;

Poison control warnings as needed based on ingredients; or

A machine-readable code (e.g., a bar code or QR code) that can be identified at checkout.

Those skilled in the art will recognize that all of this information may not be necessary in some embodiments. If located in a retail store, the consumer could apply the label to the bottle—either a container they brought from home or from a storage bin of empty containers—and then bring the bottle to the checkout where it can be scanned and paid for.

For example, if the individual is prompted to provide payment information (e.g., by swiping a payment card or typing in the payment information) before the cleaning product is produced, the machine-readable code may not be needed. Note, however, that the machine-readable code may be useful for non-payment purposes too. Assume, for example, that an individual purchases a cleaning product through an interactive dispensing machine. When the individual returns for a refill, he/she may be able to simply scan the machine-readable code (or the UFI or name/title) at the interactive dispensing machine 100 to indicate that a refill is needed. Thus, the individual may not need to input any information regarding the cleaning product that he/she would like made.

One of the most important environment benefits of the technologies described herein is the ability to reuse existing containers, including detergent bottles. As part of the production operation, individuals may be encouraged to provide containers into which the cleaning products can be dispensed. In many cases, this may be a used container from a traditional detergent manufacturer. However, since the ingredients, price, and branding are no longer accurate, the interactive dispensing machine 100 may provide a new label that can be applied directly to the used container. This may be especially important to promote safety as the individual who created the formula, the individual who obtained the cleaning product, and the individual who used the cleaning product may be different people. In the unfortunate case where the product is misused (e.g., inadvertently ingested), the information on the new label may be necessary to ensure that medical professionals are able to provide appropriate care.

In some embodiments, the interactive dispensing machine 100 includes a storage 116 for used and empty containers. Alternatively, the storage 116 could be located proximate to the interactive dispensing machine 100. For example, the storage 116 may take the form of a bin that is located adjacent to the interactive dispensing machine 100. These containers could be dispensed on behalf of the individuals for an additional fee, or these containers could be made freely available depending on the implementation of the interactive dispensing machine 100 and agreement with the retailer whose property the interactive dispensing machine 100 is situated on. Individuals may also be incentivized to turn in additional containers. For example, individuals may be allocated credits toward future purchases of cleaning products for every container that is placed in the storage 116.

Figure 2:
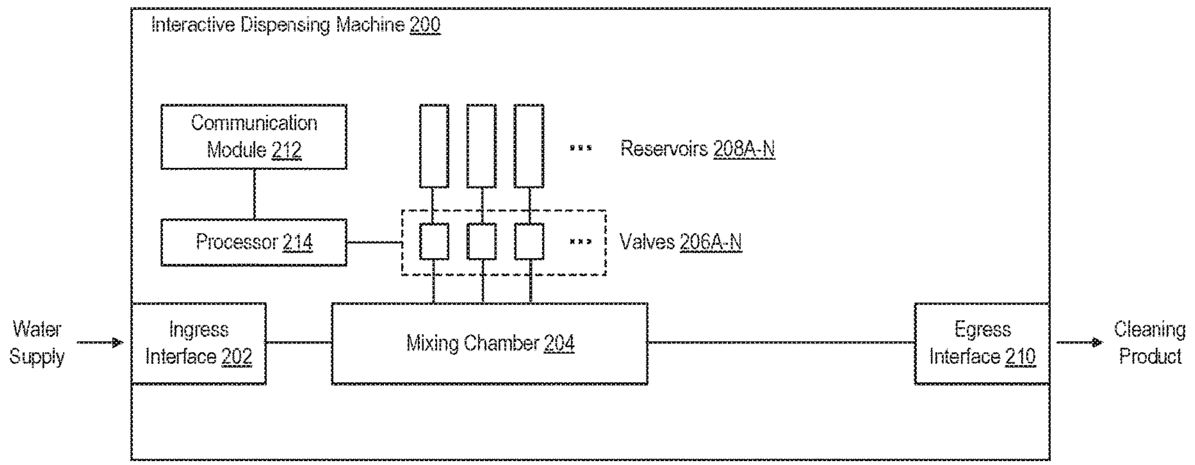
FIG. 2 includes a high-level illustration of an interactive dispensing machine in accordance with some embodiments.

FIG. 2 includes a high-level illustration of an interactive dispensing machine 200 in accordance with some embodiments. The interactive dispensing machine 200 can include an ingress interface through which water enters, an egress interface through which cleaning product exits, and a mixing chamber 204 in which the cleaning product is produced. As shown in FIG. 2, the mixing chamber 204 may be fluidly connected to the ingress and egress interfaces 202, 210.

As further discussed below, an individual may interact with the interactive dispensing machine 200 via a computer program that is executing on a separate electronic device. This computer program may be referred to as a "production platform." Accordingly, the individual may select, create, or modify formulas through the production platform in addition to, or instead of, directly through the interactive dispensing machine 200. In embodiments where the individual initiates the production of a cleaning product through the production platform, the interactive dispensing machine 200 may include a communication module 212 able to communicate with the electronic device. The communication module 212 may be, for example, wireless communication circuitry designed to establish communication channels with other electronic devices, such as mobile phones, point-of-sale (POS) systems, etc. Examples of wireless communication circuitry include integrated circuits (also referred to as "chips") configured for Bluetooth, Wi-Fi, Near Field Communication (NFC), and the like. The processor 214 can have generic characteristics similar to general-purpose processors, or the processor 214 may be an application-specific integrated circuit (ASIC) that provides control functions to the interactive dispensing machine 200. As shown in FIG. 2, the processor 214 can be coupled to the communication module 212 and valves 206A-N, either directly or indirectly, for communication purposes.

When the communication module 212 receives input indicative of an instruction to initiate production of a cleaning product, the processor 214 may identify the appropriate amounts of ingredients to be dispensed from the reservoirs 208A-N into the mixing chamber 204. To accomplish this, the processor 214 may need to obtain the formula corresponding to the cleaning product. In some embodiments, the formula is stored in a memory housed within the interactive dispensing machine 200. In some embodiments, the formula is stored in a memory (e.g., in a network-accessible server system) that is accessible to the communication module 212 across a network. In some embodiments, the formula is received by the communication module 212 from the electronic device on which the production platform is executing.

As noted above, the formula may inform the processor 214 which ingredients (and how much of those ingredients) should be deposited into the mixing chamber 204. These ingredients may include dyes, perfumes, optical brighteners, bleaching agents (e.g., sodium percarbonate), surfactants (e.g., nonionic surfactants such as alcohol ethoxylate, anionic surfactants such as alkyl ethoxy sulfate, alkyl sulfate, or linear alkylbenzene sulfonate, or amphoteric surfactants such as amine oxide), chelating agents (e.g., citric acid or cyclodextrin), enzymes, polymers, solvents, or any combination thereof. These ingredients could be in liquid form, solid form (e.g., as a powder), or aerosol form.

The processor 214 may drive the valves 206A-N in such a manner that the appropriate amounts of ingredients are dispensed from the reservoirs 208A-N into the mixing chamber 204. Moreover, the processor 214 may control the flow of water through the ingress interface 202 in such a manner that an appropriate amount of water flows into the mixing chamber 204. In some embodiments, the chemical product is formed simply by dispensing the water and ingredients into the mixing chamber. In other embodiments, additional action(s) may need to be performed. For example, the processor 214 may cause the mixing chamber to be jostled by a pneumatic mixer, heated by a heating element, etc.

Alternatively, if dry ingredients are being mixed and dispensed, the system may include a fan or air filter to prevent dry ingredients from mixing with air.

Thereafter, the cleaning product can be dispensed from the egress interface 210. The interactive dispensing machine 200 (and, more specifically, the processor 214) may be configured to cause the cleaning product to be dispensed through the egress interface 210 responsive to a determination that input has been received indicating a container is positioned adjacent to the egress interface 210. For example, the interactive dispensing machine 200 may prompt the individual (e.g., via an interface) to interact with an input component, such as a mechanical button, when the container is in the proper position. As another example, the individual may be able to specify that the container is in the proper position through the production platform executing on his/her electronic device. Additionally or alternatively, the interactive dispensing machine 200 may include a sensor that is located proximate to the egress interface 210. This sensor may generate measurements from which the processor 214 is be able to determine whether the container is positioned adjacent to the egress interface 210. The sensor could be an optical sensor that is oriented toward the area adjacent to the egress interface 210, or the sensor could be a pressure sensor located within the area adjacent to the egress interface 210.

Another noteworthy feature of the interactive dispensing machine is its ability to discharge cleaning product directly into a container provided by an individual. Such an approach allows the containers to be reused in a manner similar to the propane industry. Containers for propane are durable items, usually made of metal, that are designed for multiple uses over the course of several years. In the propane industry, individuals exchange empty containers for full containers, and then those empty containers are transported to a facility for refilling and redistributing.

Much like propane containers, the interactive dispensing machine could facilitate a container exchange program in which individuals return empty containers and then acquire new containers that have been filled with cleaning products. Alternatively, the interactive dispensing machine may allow individuals to reuse the same containers. For example, before dispensing a cleaning product, the interactive dispensing machine may prompt the individual to place a container that he/she brought near the egress interface.

Figure 3:
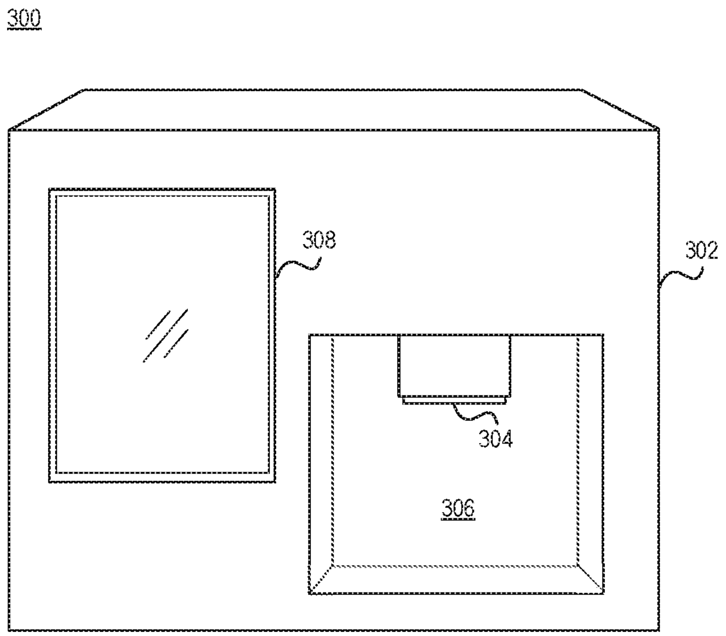
FIG. 3 includes a front view of an interactive dispensing machine.

FIG. 3 includes a front view of an interactive dispensing machine 300. As shown in FIG. 3, the interactive dispensing machine 300 includes a structural body 302 with a cavity 306 defined therein that includes the egress interface 304. Cleaning products can be dispensed through the egress interface 304 into containers placed in the cavity 306. At a high level, the cavity 306 is representative of the dispensing area in which empty containers are placed for filling. Accordingly, the cavity 306 may be designed in such a manner to collect overflow or spilled product. For example, the cavity 306 may include a trough that drains into a holding tank located inside the structural body 302.

As discussed above, a sensor located in or near the cavity 306 may be responsible for generating measurements from which the interactive dispensing machine 300 can infer whether a container is present. The sensor could be an optical sensor arranged to detect objects within the cavity 306, or the sensor could be a pressure sensor that is located directly beneath the egress interface 304 upon which containers are likely to rest.

In FIG. 3, the interactive dispensing machine 300 includes a touch-sensitive display 308 through which individuals can provide input. However, those skilled in the art will recognize that other input mechanisms could be used instead of, or in addition to, the touch-sensitive display 308. For example, other embodiments of the interactive dispensing machine 300 may have mechanical buttons corresponding to certain instructions (e.g., initiate production, dispense product).

Overview of Production platform

As discussed above, a production platform may be responsible for guiding an individual through the process for producing a cleaning product. Throughout the process, the individual may be requested to engage with the production platform. For example, the individual may be prompted to select a formula from a library of formulas maintained by the production platform, or the individual may be prompted to specify desired features (e.g., stain removal or odor removal) via an interface generated by the production platform.

For the purpose of illustration, the production platform may be described as a computer program executing on an electronic device associated with an individual who wishes to product a cleaning product. However, the production platform could also be embodied as a computer program executing on an interactive dispensing platform. Thus, the process could be completed entirely on an interactive dispensing platform, or the process could involve the interactive dispensing platform and at least one other electronic device.

Figure 4:
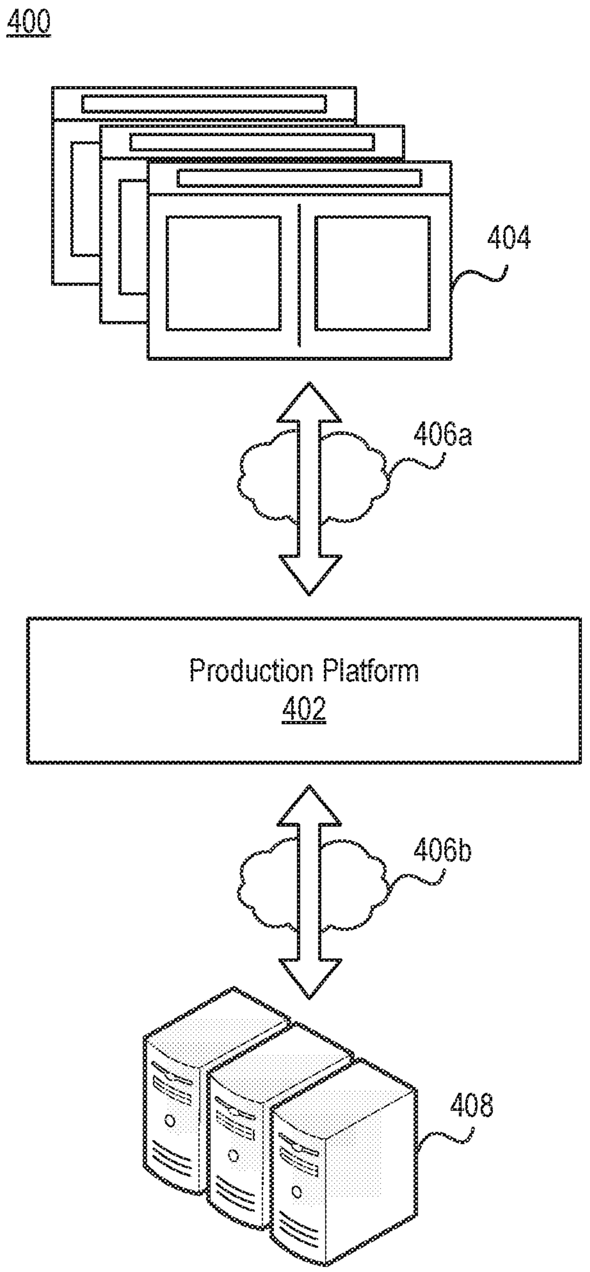
FIG. 4 illustrates an example of a network environment that includes a production platform.

FIG. 4 illustrates an example of a network environment 400 that includes a production platform 402. Individuals can interact with the production platform 402 via interfaces as further discussed below. For example, an individual may access an interface through which he/she can browse existing formulas or create new formulas. As another example, an individual may access an interface to review information regarding cleaning products, ingredients, etc. As another example, an individual may access an interface through which he/she can specify lifestyle characteristics and review formulas recommended by the production platform 402. Thus, the interfaces 404 generated by the production platform 402 may serve as either informative spaces for individuals or collaborative spaces through which formulas can be shared.

As shown in FIG. 4, the production platform 402 may reside in a network environment 400. Thus, the electronic device that the production platform 402 is executing on may be connected to one or more networks 406*a-b*. The network(s) 406*a-b* can include personal area networks (PANs), local area networks (LANs), wide area networks (WANs), metropolitan area networks (MANs), cellular networks, the Internet, etc. Additionally or alternatively, the electronic device can be communicatively coupled to other electronic devices over a short-range wireless connectivity technology, such as Bluetooth, NFC, Wi-Fi® Direct (also referred to as "Wi-Fi P2P"), and the like. As an example, the production platform 402 is embodied as a mobile application that is executable by a mobile phone in some embodiments. In such embodiments, the mobile phone may be communicatively connected to an interactive dispensing machine via a short-range wireless connectivity technology and a network-accessible server system via the Internet.

The interfaces 404 may be accessible via a web browser, desktop application, mobile application, or over-the-top (OTT) application. For example, an individual may be able to access interfaces designed to guide him/her through the production process via a mobile application executing on a mobile phone. As another example, an individual may be able to access interfaces designed to guide him/her through the production process via a web browser executing on a personal computer. Thus, the individual may not need to be located proximate to the interactive dispensing machine in order to initiate production of a cleaning product. Instead, the individual may provide all instructions needed to complete production and then simply notify the interactive dispensing machine when he/she has arrived so that the cleaning product can be produced and/or dispensed. As noted above, the interfaces may also be generated by a desktop application executing on an interactive dispensing machine. Accordingly, the interfaces 404 may be viewed on interactive dispensing machines, personal computers, tablet computers, mobile phones, wearable electronic devices (e.g., watches or fitness accessories), network-connected ("smart") electronic devices (e.g., televisions or home assistant devices), or virtual/augmented reality systems (e.g., head-mounted displays).

In some embodiments, at least some components of the production platform 402 are hosted locally. That is, part of the production platform 402 may reside on the electronic device used to access one of the interfaces 404. For example, the production platform 402 may be embodied as a mobile application executing on a mobile phone. Note, however, that the electronic device may be communicatively connected to a network-accessible server system 408 on which other components of the production platform 402 are hosted.

In other embodiments, the production platform 402 is executed entirely by a cloud computing service operated by, for example, Amazon Web Services® (AWS), Google Cloud Platform™, or Microsoft Azure®. In such embodiments, the production platform 402 may reside on a network-accessible server system 408 comprised of one or more computer servers. These computer servers can include information regarding different formulas and ingredients; computer-implemented models for designing or simulating formulas (e.g., to identify hazardous combinations); individual information such as name, location, activities, preferences, and past orders; and other assets. Those skilled in the art will recognize that this information could also be distributed amongst a network-accessible server system and one or more computing devices. For example, some information (e.g., personalized formulas) may be stored on an electronic device associated with an individual, while other information (e.g., formulas shared publicly) may be stored on the network-accessible server system 408.

Figure 5:
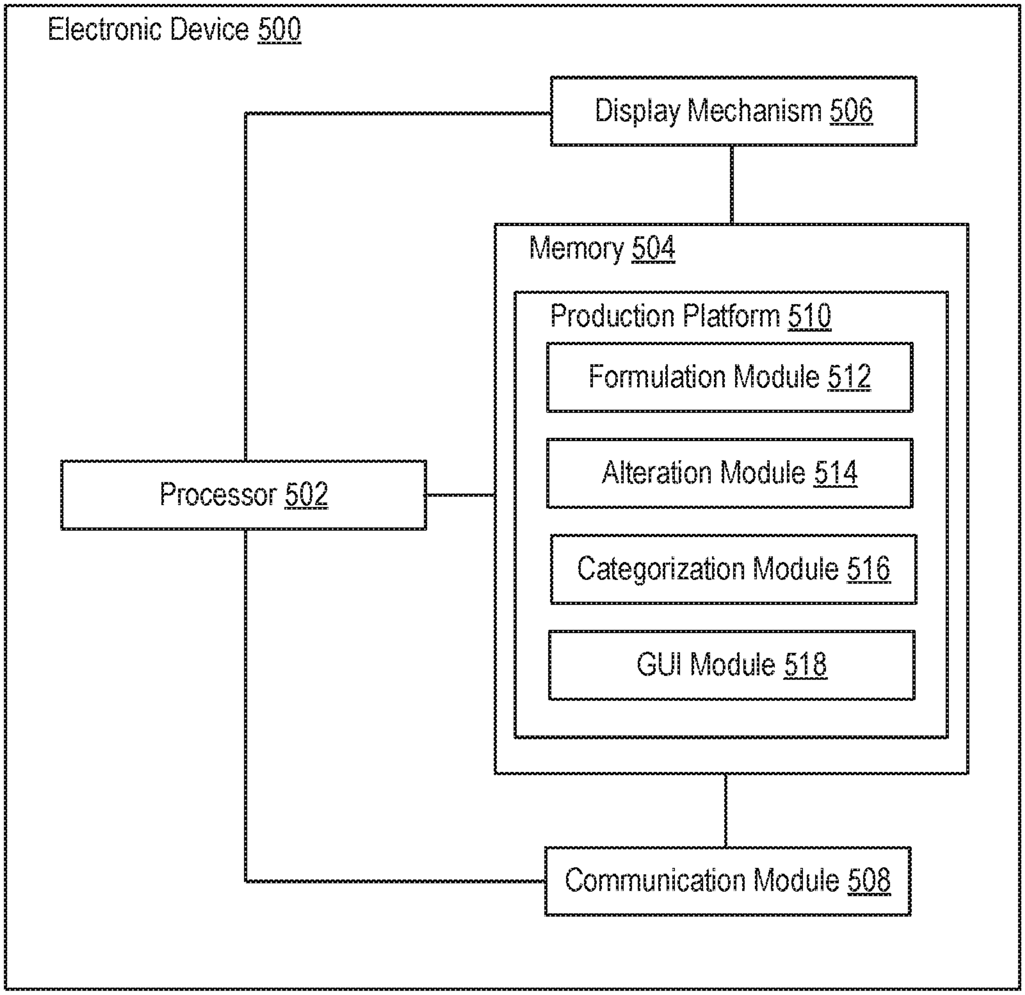
FIG. 5 illustrates an example of an electronic device on which aspects of a production platform can be executed.

FIG. 5 illustrates an example of an electronic device 500 on which aspects of a production platform 510 can be executed. In some embodiments, the production platform 510 is embodied as a computer program that is executed entirely by the electronic device 500. In other embodiments, the production platform 510 is embodied as a computer program that is executed by another electronic device (e.g., a computer server or interactive dispensing machine) to which the electronic device 500 is communicatively connected. In such embodiments, the electronic device 500 may transmit relevant information, such as input provided by an individual regarding preferences, lifestyle, and the like, to the other electronic device for further processing. Those skilled in the art will recognize that aspects of the production platform 510 could also be distributed amongst multiple electronic devices.

The electronic device 500 can include a processor 502, memory 504, display mechanism 506, and communication module 508. The communication module 508 may be, for example, wireless communication circuitry designed to establish communication channels with other electronic devices. Examples of wireless communication circuitry include integrated circuits (also referred to as "chips")

configured for Bluetooth, Wi-Fi, NFC, and the like. The processor 502 can have generic characteristics similar to general-purpose processors, or the processor 502 may be an ASIC that provides control functions to the electronic device 500. As shown in FIG. 5, the processor 502 can be coupled to all components of the electronic device 500, either directly or indirectly, for communication purposes.

The memory 504 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 502, the memory 504 can also store data generated by the processor 502 (e.g., when executing the modules of the production platform 510). Note that the memory 504 is merely an abstract representation of a storage environment. The memory 504 could be comprised of actual memory chips or modules.

The communication module 508 can manage communications between the components of the electronic device 500. The communication module 508 can also manage communications with other electronic devices. Examples of electronic devices include interactive dispensing machines, mobile phones, tablet computers, personal computers, and network-accessible server systems comprised of computer server(s). For example, in embodiments where the electronic device 500 is associated with an individual interested in having a cleaning product produced, the communication module 508 may be communicatively connected to an interactive dispensing machine and a network-accessible server system managed by a service that is responsible for managing the interactive dispensing machine.

For convenience, the production platform 510 may be referred to as a computer program that resides within the memory 504. However, the production platform 510 could be comprised of software, firmware, and/or hardware components implemented in, or accessible to, the electronic device 500. In accordance with embodiments described herein, the production platform 510 may include a formulation module 512, alteration module 514, categorization module 516, and graphical user interface (GUI) module 518. These modules can be an integral part of the production platform 510. Alternatively, these modules can be logically separate from the production platform 510 but operate "alongside" it. Together, these modules may enable the production platform 510 to guide an individual through localized production of a personalized cleaning product.

The formulation module 512 can manage formulas for various cleaning products. For example, the formulation module 512 may maintain a library of formulas that an individual may be permitted to browse. In some embodiments, the formulation module 512 is able to recommend formulas based on criteria defined by the individual. For example, if the individual specifies that he/she is interested in cleaning products that are designed to address odor while being made of natural ingredients, the formulation module 512 may search the library to identify formulas, if any, that satisfy those criteria. Moreover, if the individual opts to design a formula herself, the formulation module 512 may simulate performance of the formulation to ensure there are no unexpected (e.g., hazardous) outcomes. Thus, the formulation module 512 may simulate production of the formulation to ensure that the resulting cleaning product can be produced safely.

The alteration module 514 may be responsible for processing alterations or modifications to formulas requested by individuals. For instance, assume that an individual selects a formula recommended by the formulation module 512. However, the individual may wish to alter a feature of the formula. As an example, the individual may wish to replace non-natural ingredients in the formula with natural ingredients. The alteration module 514 can assist the individual in completing this task. In some embodiments, the alteration module 514 is designed to ensure that modifications made by individuals do not impact the safety or efficacy of the resulting product. That is, the alteration module 514 may review modifications to make sure those modifications are suitable since most individuals have a limited understanding of the chemical processes that occur during the washing process. Additionally or alternatively, the alteration module 514 may assist the individual by recommending modifications. Again, assume that an individual wishes to replace non-natural ingredients in a formula with natural ingredients. In such a scenario, the alteration module 514 may identify those non-natural ingredients that should be removed from the formula and/or identify natural ingredients that could serve as replacements.

The categorization module 516 may be responsible for categorizing formulas. Generally, the categorization module 516 will categorize formulas along multiple dimensions. For example, the categorization module 516 may specify whether a given formula corresponds to a cleaning product suitable for individuals with active lifestyles, infants, teenagers, etc. Similarly, the categorization module 516 may specify whether a given formula is designed for stain removal, odor removal, etc. These categorizations (also referred to as "labels") may help the formulation module 512 examine the library of formulas in a more efficient manner.

The GUI module 518, meanwhile, may be responsible for generating the interfaces through which information is input throughout the production process. For example, an individual may specify the features that he/she desires in a cleaning product through an interface generated by the GUI module 518. As another example, the GUI module 518 may generate an interface through which the individual can browse through formulas.

Figure 6:
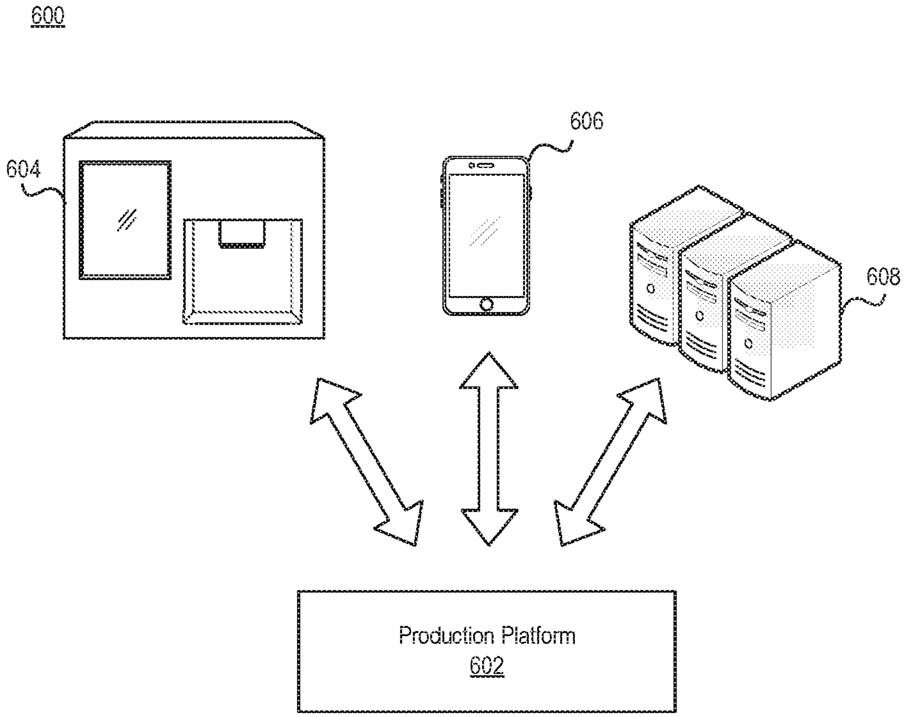
FIG. 6 depicts another example of a communication environment that includes a production platform configured to obtain data from one or more sources.

FIG. 6 depicts another example of a communication environment 600 that includes a production platform 602 configured to obtain data from one or more sources. Here, the production platform 602 may obtain data from an interactive dispensing machine 604, mobile phone 606, and network-accessible server system 608 (collectively referred to as the "networked devices"). For example, the production platform 602 may obtain data regarding the preferences of an individual from the mobile phone 606 and data regarding production of a cleaning product from the interactive dispensing machine 604.

The networked devices can be connected to the production platform 602 via one or more networks. These network(s) can include PANs, LANs, WANs, MANs, cellular networks, the Internet, etc. Additionally or alternatively, the networked devices may communicate with one another over a short-range wireless connectivity technology. For example, if the production platform 602 resides on the mobile phone 606, then data may be obtained from the interactive dispensing machine over a Bluetooth communication channel while data may be obtained from the network-accessible server system 608 over the Internet via a Wi-Fi communication channel.

Embodiments of the communication environment 600 may include a subset of the networked devices. For example, some embodiments of the communication environment 600 include an interactive dispensing machine 604 that exchanges data with a mobile phone 606 on which the production platform 602 resides. As another example, some embodiments of the communication environment 600 include a network-accessible server system 608 that exchanges data with an interactive dispensing machine 604 on which the production platform 602 resides.

Methodologies for Localized Production of Customized Cleaning Products

There are a number of different scenarios in which an individual (also referred to as a "consumer") could use the technologies described herein to produce a customized cleaning product. The following are examples of some common use cases.

In perhaps the simplest implementation, a consumer may bring an empty container to be filled with a cleaning product such as detergent. In this scenario, the consumer may be prompted to scan the SKU, UPC, or label on the empty container. In some embodiments the consumer may scan the empty container using the interactive dispensing machine, while in other embodiments the consumer may scan the empty container using another electronic device (e.g., by taking a photo of the empty container). Then, the production platform can access a database to obtain information regarding the detergent originally stored in the empty container. For instance, the production platform may be able to establish that the empty container corresponds to a 50 ounce version of Tide Free and Clear detergent. This database may include information that maps cleaning products to UFIs that most closely match those products. Thus, the database may have a separate entry for each detergent manufactured by Tide, Gain, and the like, though some of those entries may be mapped to the same UFI. Based on this information, the interactive dispensing machine can establish how much detergent (and, more specifically, how much of each ingredient) to dispense into the empty container.

Alternatively, a consumer might bring in a coupon, promotional flyer, or article that features a sponsored formula accompanied by a code. In some embodiments, the design of the documentation serves as the code. That is, the production platform may be able to parse the documentation to establish words, colors, or geometric shapes that identify the sponsored formula. In other embodiments, the documentation may include a machine-readable code such as a barcode or QR code. In such a scenario, the production platform could identify the corresponding formula in the database using the code. Moreover, the production platform may prompt the consumer to scan the empty container to be filled and/or specify the size of the empty container. Based on this information, the interactive dispensing machine can establish how much of each ingredient is necessary to fill the empty container.

In embodiments where the production platform is embodied as a computer program such as a mobile application or web browser, a consumer might use the computer program to browse existing formulas, research ingredients, or create custom formulas. If the consumer creates a custom formula, this formula can be assigned a UFI by the production platform. In some embodiments, the consumer may be permitted to name the custom formula (e.g., "Todd's eco-friendly camping detergent"). This name may be visible to all users of the production platform, a subset of users of the production platform (e.g., friends of Todd), or only the consumer who created the custom formula. Thereafter, the consumer may be able to access the production platform (e.g., on his/her mobile device or an interactive dispensing machine) and then simply enter the UFI. Before ingredients are deposited in accordance with the custom recipe, the consumer may be prompted to scan the empty container that is to be filled and/or specify the size of the empty container as discussed above.

Alternatively, upon accessing the production platform, the consumer may be able to browse through formulas that were previously created on his/her behalf. For example, upon accessing the production platform, the consumer may be prompted to sign into an account for which registration is necessary, and all orders placed by the consumer through the production platform may be associated with the account. Similarly, the consumer may be permitted to browse through existing formulas through the production platform. As an example, the consumer may be able to choose from popular, pre-built formulas that can be used "as is" or could be modified.

In other embodiments, a consumer could simply walk up to an automatic dispensing machine to select a formula and/or ingredients, learn the cost implications of those choices, and alter the formula if desired. For example, the consumer may be permitted to add, remove, or replace ingredients, though the production platform may examine those changes to make sure that (1) none of the changes would result in a harmful product and (2) the product will still have its intended effect.

In an alternate embodiment, the dispensing system might be located in a warehouse or facility and receive where it processes larger numbers of request. In this embodiment dry or liquid product could be customized for the recipient and then shipped or delivered without the consumer needing to visit the location where the cleaning product is created.

In each of the scenarios described above, the information in the database accessible to the production platform can assist consumers in learning more about cleaning products and how to personalize those cleaning products to better suit their lifestyles. To facilitate long-term use, the production platform may also record aspects of interactions with consumers. For example, the production platform may record which ingredients are selected or replaced by a consumer to define a preference that can be stored in his/her account. As another example, the production platform may keep a record of volume of product dispensed, price, and other factors to learn consumer preferences over time and better predict input ingredients for the machines.

Figure 7:
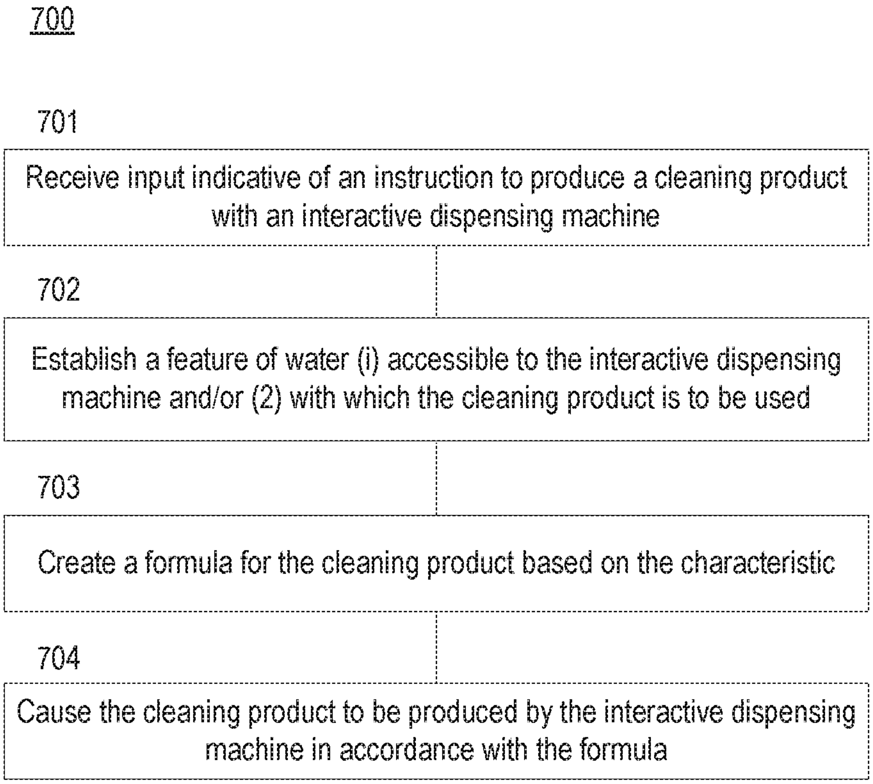
FIG. 7 depicts a flow diagram of a process for producing a cleaning product in a customized manner based on the water with which the product will be created and/or used.

FIG. 7 depicts a flow diagram of a process 700 for producing a cleaning product in a customized manner based on the water with which the product will be created and/or used. Initially, a production platform can receive input indicative of an instruction to produce a cleaning product with an interactive dispensing machine (step 701). Generally, the input will specify a characteristic desired by the individual for whom the cleaning product is to be produced. For example, the individual may select a cleaning product that offers stain removal, odor removal, etc. As another example, the individual may specify that he/she would like a cleaning product that is organic, eco-friendly, or suitable for high-efficiency washers. In such a scenario, the production platform may cause display of formulas for cleaning products that have the specified characteristic, and the individual can select from those formulas as discussed above.

Before producing the cleaning product, the production platform can establish a feature of water (i) accessible to the interactive dispensing machine and/or (ii) with which the cleaning product is to be used (step 702). The feature may be temperature, turbidity, conductivity, pH, total suspended solids (TSS), bacteria level (e.g., of fecal coliform, e. coli, or enterococci), dissolved oxygen level, nutrient level, or toxic substance level (e.g., of ammonia, metals such as arsenic, cadmium, copper, mercury, or lead, organics such as household and industrial chemicals, agricultural pesticides, etc.). There are several different ways in which the production platform can establish the feature.

In some embodiments, the production platform is configured to access a water quality report for a given geographical area and then parse the water quality report to discover the feature. The given geographical area may be associated with the interactive dispensing machine, or the given geographical area may be associated with the individual. For example, the individual may be prompted to input residence information (e.g., a zip code), or residence information of the individual may be derived (e.g., when the individual swipes a payment card for payment).

In other embodiments, the production platform determines the feature based on analysis of measurement(s) generated by a sensor that is in direct contact with the water. Some embodiments of the interactive dispensing machine include one or more sensors designed to measure features of the water received through the ingress interface. For example, an interactive dispensing machine may have a pH sensor and a TSS sensor located near the ingress interface. These sensor(s) can be configured to continually or periodically generate measurements indicative of discrete tests of the water. For example, upon receiving the input indicative of the instruction to produce the cleaning product, the production platform may transmit an instruction to a sensor that prompts the sensor to generate at least one measurement.

Thereafter, the production platform can create a formula for the cleaning product based on the characteristic (step 703). That is, the formula can be customized based on the water with which the cleaning product will be produced by the interactive dispensing machine and/or the water with which the cleaning product will be used by the individual. While the production platform may be said to "create" the formula, the production platform may simply select an appropriate formula from a library of formulas in some embodiments. In other embodiments, the production platform may either develop an entirely new formula or alter an existing formula to account for the feature of the water.

Then, the production platform can cause the cleaning product to be produced by the interactive dispensing machine in accordance with the formula (step 704). In embodiments where the production platform is executing on the interactive dispensing machine, the production platform may be responsible for driving valves/pumps to dispense appropriate amounts of each ingredient as further discussed above. In embodiments where the production platform is executing on an electronic device associated with the individual, the production platform may transmit the formula to the interactive dispensing machine. Receipt of the formula may prompt the interactive dispensing machine to produce the cleaning product, or the individual may be prompted to manually confirm that production should begin as discussed above.

Figure 8:
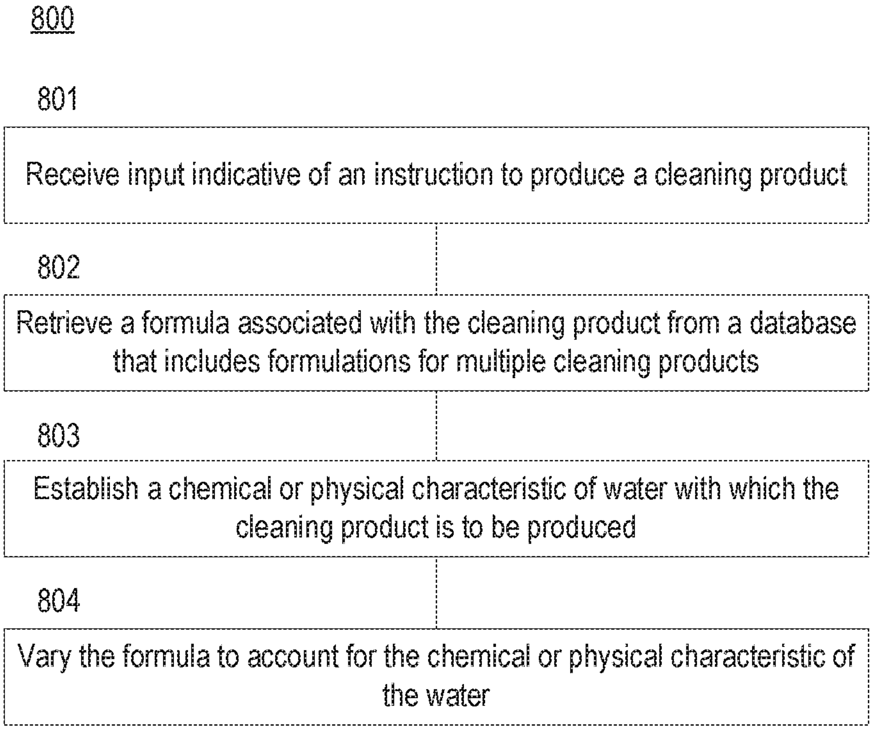
FIG. 8 depicts a flow diagram of a process for altering a formula for a cleaning product based on a feature of water with which the cleaning product is to be produced.

FIG. 8 depicts a flow diagram of a process 800 for altering a formula for a cleaning product based on a feature of water with which the cleaning product is to be produced. Initially, a production platform can receive input indicative of an instruction to produce a cleaning product (step 801). In some embodiments, the instruction is explicit. For example, an individual may specify that the cleaning product should be produced by indicating as much through an interface generated by the production platform. In other embodiments, the instruction is implicit. For example, the individual may simply present an empty container to an interactive dispensing machine for refilling as discussed above, or the individual may interact with a notification (e.g., a push notification) generated by the production platform that inquires as to whether the cleaning product should be produced.

Thereafter, the production platform can retrieve a formula associated with the cleaning product from a database that includes formulas for multiple cleaning products (step 802). As an example, assume that the individual provides a UFI to the production platform as input. In such a scenario, the production platform can examine the database to identify a formula that matches the UFI. Alternatively, the production platform may allow the individual to specify one or more desired features of the cleaning product, and then the production platform can retrieve a formula that matches has some or all of those desired feature(s). For instance, the individual might specify that he/she would like a detergent comprised of natural ingredients that is appropriate for infants and high-efficiency washers.

The production platform can then establish a chemical or physical characteristic of water with which the cleaning product is to be produced (step 803). As discussed above with respect to FIG. 7, this characteristic can be established in several different ways. In some embodiments, the characteristic is pH as measured by relative amounts of free hydrogen and hydroxyl ions in the water. In other embodiments, the characteristic is hardness as measured by multivalent cations in the water. The characteristic could be established by the production platform based on measurement(s) generated by sensor(s) accessible to (e.g., housed in) the interactive dispensing machine, or the hardness of the water could be established by the production platform based on available literature. For example, the production platform may be able to access an Internet-accessible source (e.g., a website) on which information regarding the characteristic can be found.

Moreover, the production platform may vary the formula to account for the characteristic of the water (step 804). Thus, the production platform may be able to produce a cleaning product that is personalized to account for the water with which it is made. These variations can take several different forms. In some embodiments, the production platform may replace one or more ingredients in the formula. As an example, the production platform may replace a harsh bleaching agent with another that is more suitable for use with delicate clothing, etc. Additionally or alternatively, the production platform may vary the amount of one or more ingredients in the formula. For instance, if the production platform discovers that the water available to the interactive dispensing machine is hard, then the amount of bleaching agent or surfactant may be increased or a water softener agent might be added.

Note that the cleaning product could alternatively be customized based on the water with which it is to be used. While the process 800 of FIG. 8 will be largely identical, the production platform would establish the chemical or physical feature of the water with which the cleaning product is to be used as discussed above with respect to FIG. 7.

Figure 9:
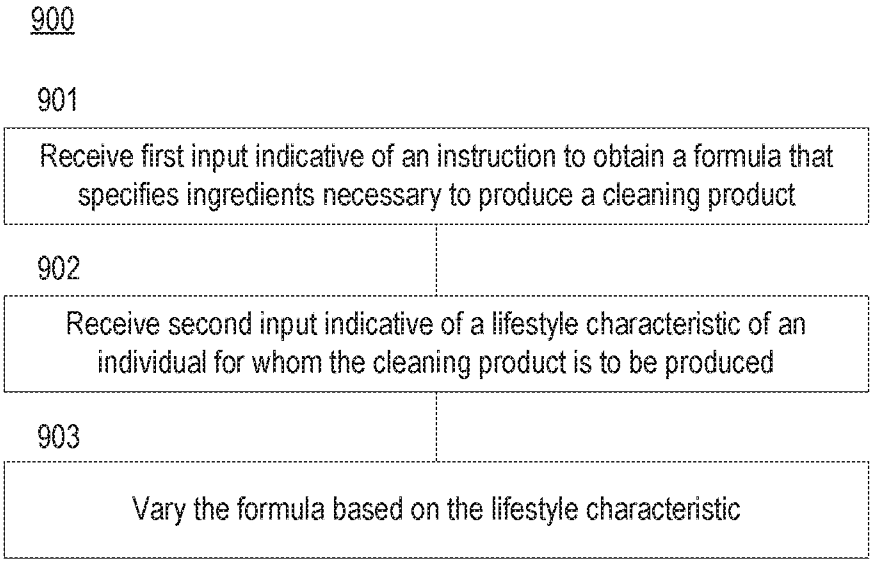
FIG. 9 depicts a flow diagram of a process for altering a formula for a cleaning product based on a lifestyle characteristic of a consumer.

FIG. 9 depicts a flow diagram of a process 900 for altering a formula for a cleaning product based on a lifestyle characteristic of a consumer. Initially, a production platform can receive first input indicative of an instruction to obtain a formula that specifies the ingredients necessary to produce a cleaning product (step 901). Step 901 may be largely similar to step 701 of FIG. 7 and step 801 of FIG. 8.

Moreover, the production platform may receive second input indicative of a lifestyle characteristic of an individual (also referred to as a "consumer") for whom the cleaning product is to be produced (step 902). Through the production platform, the consumer may specify, for example, that he/she is interested in a cleaning product suitable for an active lifestyle, sedentary lifestyle, etc. Similarly, the consumer may specify that he/she is interested in a cleaning product suitable for infants, teenagers, elderly individuals, etc.

Thereafter, the production platform can vary the formula based on the lifestyle characteristic (step 903). Step 903 may be largely similar to step 804 of FIG. 8, though the formula is varied to account for the lifestyle characteristic rather than a chemical or physical characteristic of water. As an example, the production platform may vary the formula by replacing at least one ingredient. For instance, if the consumer indicates that he/she is interested in a cleaning product suitable for infants, then the production platform may vary the formula by replacing non-natural ingredients with natural ingredients and/or replacing potentially harmful ingredients, such as chlorine and phosphates, with safer ingredients. As another example, the formula may be varied by altering the amount of at least one ingredient. For instance, if the consumer indicates that he/she is interested in a cleaning product suitable for infants, then the production platform may vary the formula by decreasing the amount of ingredients (e.g., dyes) that are not necessary or could prove to be detrimental/harmful. Similarly, the production platform could eliminate some ingredients altogether. The production platform may determine that some ingredients, like dyes and perfumes, are simply not necessary in some situations.

Unless contrary to physical possibility, it is envisioned that the steps described above may be performed in various sequences and combinations. For example, the process described above with respect to FIG. 9 could be performed multiple times in succession as the individual specifies new lifestyle characteristics. Thus, the individual could create multiple personalized products in succession. As another example, some steps in the process described above with respect to FIG. 9 (namely, steps 902-903) could be performed in succession as the consumer inputs multiple lifestyle characteristics. For instance, a consumer may specify that he/she would like a detergent suitable for teenagers and adults with sedentary lifestyles. In such a scenario, the production platform may vary the formula in an attempt to address these lifestyle characteristics. Those skilled in the art will recognize, however, that some combinations of lifestyle characteristics may be fully addressable simultaneously. For instance, the production platform may not be able to design a cleaning product that is optimized for both teenagers and infants.

These processes could also be performed in conjunction with one another. Thus, upon receiving input indicative of an instruction to produce a cleaning product, the production platform may prompt the individual to specify his/her desired feature(s) and any lifestyle characteristics of which the production platform should be aware in order to identify a formula. Moreover, the production platform could establish a feature of the water with which the cleaning product is to be used to determine how, if at all, the formula should be altered.

Other steps could also be performed in some embodiments. For example, an interactive dispensing machine may be designed to perform a cleaning operation before, during, or after producing a cleaning product. As an example, the interactive dispensing machine may be configured to purge residual ingredients by flushing components (e.g., the mixing chamber, egress interface, and other mechanisms that facilitate dispensing of the cleaning product) with water on a periodic basis. Additionally or alternatively, the cleaning operation may be performed on an ad hoc basis. For instance, the cleaning operation may be performed before each cleaning product is produced, or the cleaning operation may be performed after each cleaning product is produced.

Formula Information, Transparency, and Sharing

Traditionally, consumers have had little insight into the ingredients of cleaning products. The technologies described herein change that paradigm by providing greater transparency into the formulas of cleaning products. As part of the customization process, consumers may have the option to learn about ingredients and their function, cost, and environmental impact. The technologies described herein may also provide an avenue for consumers (and experts) to more easily learn about, explore, share, and publish unique formulas optimized for specific and varied use cases.

As noted above, information about consumer selections and preferences can be stored in a database. The database may include information concerning ingredient compatibility and interactions to ensure the final cleaning product is safe. For example, the production platform may be designed to warn a consumer and/or prevent dispensing of a cleaning product whose formula contains ingredients that, when combined, could burn, damage, or otherwise alter clothes. In addition, the production platform may be designed to analyze the ingredients so that, if necessary, appropriate elements can be added to ensure that all ingredients are uniformly distributed in a suspension and the resulting cleaning product stays in a mixed state.

Formulas may be assigned UFIs for improved cataloguing, searching, and browsing. Each UFI may be an alphanumeric value that acts as a key value for identifying the corresponding formula. In some embodiments, UFIs and corresponding information are stored in a key-value data structure (or simply "key-value structures") in the database. Key-value structures function similar to a dictionary, where a word is associated with a definition. In this case, however, the UFI is representative of the word while the formula—including all ingredients and their amounts—is representative of the definition. In other embodiments, UFIs are hexadecimal values while the associated formula is stored as a JavaScript Object Notation (JSON) array as follows:

{UFI: E9B4BC9,
Name: Todd's Detergent—Attempt #5
Alcohol Ethoxylate (Non-Ionic Surfactant): 0
Alkyl Ethoxy Sulfate (Ionic Surfactant): 15
Alkyl Sulfate (Ionic Surfactant): 30
Ionic Amine Oxide: 0
Cationic Amine Oxide: 15
Non-Ionic Amine Oxide: 0
Citric Acid: 5
Cyclodextrin: 10
Ethanol: 6
Hydrogen Peroxide: 2
Linear Alkylbenzene Sulfonate: 1
Percarbonate: 2
Polyethylene Glycol: 4
Polyethylene Oxide: 3
Water: 0}

In this example, the formula has 11 ingredients with a value for each in milliliters (ml) for a given volume.

The production platform could increase or decrease these base amounts as necessary based on the size of the container that the consumer has provided. Based on the new values, the interactive dispensing machine can control its valves to release appropriate amounts of each ingredient from the corresponding reservoir.

By assigning a UFI to each formula, a consumer only needs to invest the time to create a custom formula once. Thereafter, the consumer may be able to readily modify or reorder the custom formula as discussed above. UFIs may be shared as an alphanumeric value, machine-readable code (e.g., barcode or QR code), or any other digital or print medium. For instance, printed labels showing the UFI (or information representative of the UFI) could be provided by the interactive dispensing machine for attachment to the container for subsequently refilling.

To illustrate the flexibility and level of customization that is possible, a few of the millions of unique formulas that can be created are presented below:

[Product UFI A9F4BC2] Eco-Friendly Phoenix Teen Baseball Septic: A custom formula optimized for hardness and pH levels of Phoenix water to optimally clean clothes for a family with a sweaty teenager that plays baseball on Arizona red clay. This formula does not have optical brighteners, uses select plant-based ingredients, has a citrus fragrance, and is specifically formulated to be compatible with septic systems.

[Product UFI B7E9AD3] Santa Barbara Oil Rig Worker Low Cost, HE Machine: A custom formula optimized for quality of water in Santa Barbara for a woman who works on an oil derrick whose coveralls are often stained by petroleum products and who wants to create an effective but inexpensive detergent that works in high-efficiency washers.

[Product UFI C1B9F4] Miami Senior Incontinence Hibiscus Scent Level 6: A custom formula optimized for quality of water in Miami for an elderly couple with incontinence issues that benefits from ingredients usually targeted at infant clothes to combat urine odor. Includes a hibiscus fragrance at a specific intensity.

In each of these cases, the custom formula could easily be shared so that others with similar requirements can benefit. For example, using the examples provided above, the Miami retirement community where the incontinent elderly couple lives might publish a human- or machine-readable code corresponding to that formula, thereby enabling other residents to easily adopt or modify the formula (e.g., with a scent other than hibiscus).

In another example, a local retainer might publish an advertisement to nearby residents that all have similar requirements, such as pH/hardness of water and septic systems. In this example, the retailer could publish an advertisement with the UFI (or information representative of the UFI) and a call to action inviting those residents to further customize the formula based on their other needs.

Due to its extensive reach and customization options, the production platform enables any individual, celebrity, expert, or entity (e.g., retailer, manufacturer, charity, university, sports organization) to create, public, and share formulas. Consumers may be awarded rewards (e.g., loyalty points) for selecting specific formulas, earn money (e.g., for charity) for each cleaning product produced, or simply benefit from the expertise of others. In this manner, entities could create formulas that are targeted and advertised to select populations (e.g., males from 25 to 34 years old, females from 35 to 44 years old, teenagers, etc.).

Methodologies for Configuring Formulas

There are many different ways that consumers can create, modify, or select formulas. Several examples are provided below for illustration; however, these should not be interpreted as limiting in any sense. Other approaches will become apparent as various technologies further evolve.

Direct Entry: In the simplest scenario, consumers may be able to create custom formulas directly through the interactive dispensing machine.

Indirect Entry: A consumer may be permitted to create custom formulas through a computer program executing on an electronic device, such as a mobile phone or tablet computer. This computer program may also allow the consumer to learn about ingredients, browse existing formulas, and the like. Any formulas created through the computer program may be assigned UFIs as discussed above. These UFIs and formulas are transmitted to a network-accessible server system for storage. Additionally or alternatively, these UFIs and formulas may be transmitted directly to an interactive dispensing machine.

Scan/Entry of UFI: A consumer may be permitted to present a human- or machine-readable code associated with a UFI. For example, the consumer may be able to scan the code at an interactive dispensing machine, or the consumer may be able to scan the code with an electronic device on which a production platform is executing. The code might entitle the consumer to a benefit (e.g., a coupon), and thus may be included in promotional materials associated with an enterprise (e.g., a camping retailer may create a promotion for discounted detergent designed to treat clothes exposed to poison oak).

Scan of Existing Container: A consumer may be permitted to scan an existing container. This could be an empty container that he/she brought from home or a new container obtained from the store where the interactive dispensing machine is located. The production platform could then look up the SKU or UPC to determine the manufacturer and product. Based on this information, the production platform could identify the formula that most closely resembles the original product. It is important to note that it may be impossible to recreate some formulas exactly due to proprietary ingredients/formulas.

Geolocation: Some formula inputs could be added automatically if desired. For example, consumers could provide residence information, such as zip code, to the production platform, thereby enabling the production platform to cross-reference approximate location with known information about water hardness, pH, and other environmental factors (e.g., soil type) that can aid in designing formulas. Alternatively, the interactive dispensing machine may be aware of its location, and thus could infer the needs of consumers in that geographical region and adjust formulas accordingly.

Methodologies for Modifying Formulas

After a consumer has selected a formula, that formula could be further modified as discussed above. For instance, a consumer could scan a container of detergent and load the approximate list of ingredients and associated amounts. The consumer could then elect to retain some or all of the ingredients, replace some or all of the ingredients, or add new ingredients. As an example, the consumer may elect to retain all ingredients but add a "citrus" scent with intensity level of 7 (where 1 is minimal scent and 10 is maximum scent).

In another example, assume that an entity runs a promotion with a special "ketchup stain remover" feature. A consumer could then visit a retail location of the entity with the promotion and an empty container. When the consumer scans the promotion, the interactive dispensing machine may identify the corresponding UFI in the database. However, the consumer might still be requested or allowed to modify the formula, for example, to ensure compatibility with his/her washer, septic system, etc. Thus, the consumer might be prompted to specify whether he/she is interested in the "septic friendly" option. Depending on the answers from the consumer, the interactive dispensing machine may alter the formula by adding, removing, or replacing ingredients.

In another example, a consumer may click on an advertisement for a detergent sponsored by a charity, where the advertisement indicates that part of the purchase price will go towards that charity. The consumer may initially be redirected to a website where he/she is allowed to choose one of the sponsored detergent options. However, the consumer may still need to alter the selected option (e.g., to be compatible with a high-efficiency washer).

In another example, a consumer may receive an email from a friend that lives in another state. In the email, the friend might share the UFI for a detergent that he/she believes works well for children suffering from allergies. However, the formula may need to be altered—manually or automatically—to account for differences in pH and hardness of water between the friend's location and consumer's location. Using the production platform, the consumer may enter the UFI and then select options to modify for pH and hardness. By providing residence information (e.g., a zip code), the production platform may be able to modify the formula on behalf of the consumer.

Methodologies for Establishing Volume

In addition to amount of each ingredient, the interactive dispensing machine needs to know how much cleaning product to dispense. In most cases, the consumer can simply specify how much cleaning product should be dispensed. For example, the consumer may specify the volume of cleaning product that should be produced through an interface generated by the production platform. Such an approach may be helpful if the consumer wants less cleaning product to be dispensed than is possible given the size of the container. As another example, the consumer may scan the empty container to be used, in which case the production platform may look up the SKU or UPC in the database to establish the size of the container.

As noted above, the interactive dispensing machine may include valves, pumps, or other mechanisms for controlling how much of each ingredient is dispensed. Collectively, these components may be referred to as "dispensing elements." Such an approach ensures that consumers may purchase small amounts of cleaning products if desired. Said another way, consumers may be able to purchase small amounts of cleaning products for targeted purposes/needs. As an example, a family returning from a camping trip may only need enough detergent designed to address contamination by oils from poison ivy for one or two loads. By allowing consumers to specify the amount of cleaning product to be dispensed, consumers need only buy as much as they need.

Processing System

Figure 10:
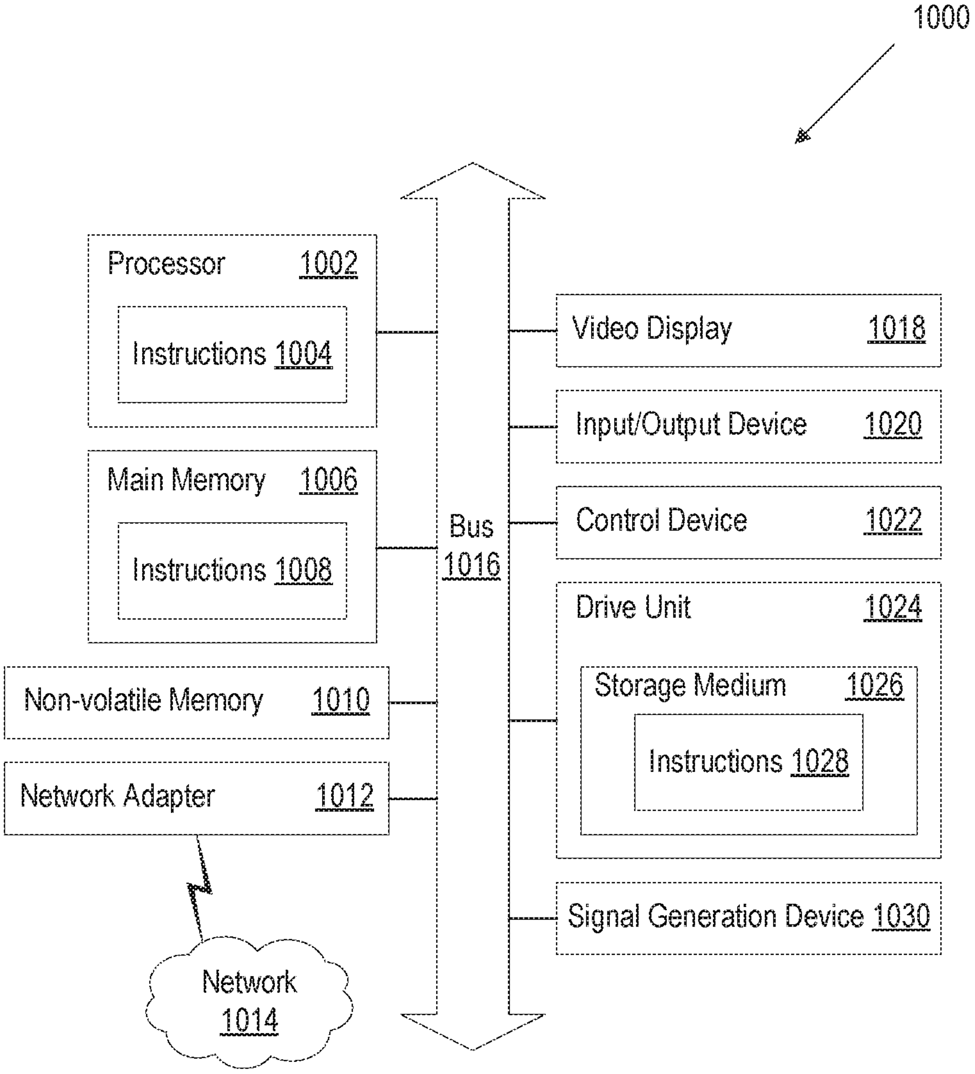
FIG. 10 is a block diagram illustrating an example of a processing system in which at least some operations described herein can be implemented.

FIG. 10 is a block diagram illustrating an example of a processing system 1000 in which at least some operations described herein can be implemented. For example, some components of the processing system 1000 may be hosted on an electronic device that includes a production platform (e.g., production platform 510 of FIG. 5). As another example, some components of the processing system 1000 may be hosted on an interactive dispensing machine (e.g., interactive dispensing machine 100 of FIG. 1 or interactive dispensing machine 200 of FIG. 2).

The processing system 1000 may include a processor 1002, main memory 1006, non-volatile memory 1010, network adapter 1012 (e.g., a network interface), video display 1018, input/output device 1020, control device 1022 (e.g., a keyboard, pointing device, or mechanical input such as a button), drive unit 1024 that includes a storage medium 1026, or signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or bus compliant with Institute of Electrical and Electronics Engineers (IEEE) Standard 1394.

The processing system 1000 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1000.

While the main memory 1006, non-volatile memory 1010, and storage medium 1024 are shown to be a single medium, the terms "storage medium" and "machine-readable medium" should be taken to include a single medium or multiple media that stores one or more sets of instructions 1026. The terms "storage medium" and "machine-readable medium" should also be taken to include any medium that is capable of storing, encoding, or carrying a set of instructions for execution by the processing system 1000.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memories and storage devices in a computing device. When read and executed by the processor 1002, the instructions cause the processing system 1000 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 1010, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

The techniques introduced here can be implemented using software, firmware, hardware, or a combination of such forms. For example, aspects of the present disclosure may be implemented using special-purpose hardwired (i.e., non-programmable) circuitry in the form of application-specific integrated circuits (ASICs), programmable logic devices (PLDs), field-programmable gate arrays (FPGAs), and the like.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system designed to produce and then dispense cleaning products, the system comprising:

a structural body that includes—
  an ingress interface through which water can be obtained, and
  an egress interface through which cleaning products can be discharged,
  wherein the egress interface is located in a cavity in which containers are placed for filling with cleaning products;
a pressure sensor that is located in the cavity beneath the egress interface, so as to generate an output that indicates whether a container is presently located in the cavity;
a series of reservoirs in which ingredients are stored;
a series of dispensing elements that, when activated, controllably dispense the ingredients from the series of reservoirs;
a mixing chamber that includes a pneumatic mixer and is fluidly connected to the ingress interface, the egress interface, and the series of dispensing elements; and
a processor configured to:
  receive input indicative of an instruction to produce a cleaning product,
  retrieve a formula associated with the cleaning product from a memory,
  determine, based on an analysis of the output generated by the pressure sensor, that a container is presently located in the cavity, and
  in response to determining that the container is presently located in the cavity,
    cause the cleaning product to be produced in accordance with the formula by—
      permitting water to flow through the ingress interface into the mixing chamber,
      driving the series of dispensing elements such that appropriate amounts of at least some of the ingredients are dispensed into the mixing chamber, thereby combining with the water to form a mixture,
      causing the mixture to be jostled by the pneumatic mixer, and
      causing the mixture to be dispensed through the egress interface into the container.

2. The system of claim 1, wherein the memory is accessible to the processor via a network.

3. The system of claim 1, wherein the ingredients include dyes, perfumes, optical brightening agents, bleaching agents, surfactants, chelating agents, enzymes, polymers, solvents, or any combination thereof.

4. The system of claim 1, further comprising:
a user interface through which an individual is able to provide second input indicative of a confirmation that the container is presently located in the cavity.

5. The system of claim 1, further comprising:
a communication module able to establish a wireless communication channel with a computer program executing on an electronic device associated with an individual,
  wherein through the computer program executing on the electronic device, the individual is able to provide second input indicative of a confirmation that the container is presently located in the cavity.

6. The system of claim 1, further comprising:
a printer configured to output a label for the cleaning product that specifies the at least some of the ingredients.

7. The system of claim 1, further comprising:
a communication module able to establish a wireless communication channel with a printer;
wherein the processor is further configured to:
  forward information regarding the at least some of the ingredients to the communication module for transmission to the printer, so as to cause the printer to output a label for the cleaning product.

8. The system of claim 1,
wherein the processor is further configured to:
receive second input indicative of a geographical location associated with an individual for whom the cleaning product is to be produced,
access a water quality report that is associated with the geographical location, and
parse the water quality report to discover a characteristic of the water, and
wherein the formula is retrieved from amongst multiple formulas in the memory based on the characteristic.

9. The system of claim 1, further comprising:
a sensor that is in direct contact with the water that flows through the ingress interface into the mixing chamber, wherein the sensor is configured to generate at least one measurement of a characteristic of the water.

10. The system of claim 9, wherein the formula is retrieved from amongst multiple formulas in the memory based on the at least one measurement.

11. The system of claim 9, wherein the characteristic is temperature, turbidity, conductivity, pH, total suspended solids, bacteria level, dissolved oxygen level, nutrient level, or toxic substance level.

12. The system of claim 1, wherein the cavity includes a trough that drains into a holding tank located inside the structural body.

13. A system of claim 1 designed to produce and then dispense cleaning products, the system comprising:
a structural body that includes—
an ingress interface through which water can be obtained, and
an egress interface through which cleaning products can be discharged,
wherein the egress interface is located in a cavity in which containers are placed for filling with cleaning products;
a pressure sensor that is located in the cavity beneath the egress interface, so as to generate an output that indicates whether a container is presently located in the cavity;
a series of reservoirs in which ingredients are stored;
a series of dispensing elements that, when activated, controllably dispense the ingredients from the series of reservoirs;
a mixing chamber that includes a pneumatic mixer and is fluidly connected to the ingress interface, the egress interface, and the series of dispensing elements; and
a processor configured to:
receive first input indicative of an instruction to produce a cleaning product,
retrieve a formula associated with the cleaning product from a memory,
determine, based on an analysis of the output generated by the pressure sensor, that a container is presently located in the cavity,
receive second input indicative of a geographical location associated with an individual for whom the cleaning product is to be produced,
access a water quality report that is associated with the geographical location,
parse the water quality report to discover a characteristic of the water,
customize the formula to account for the characteristic of the water with which the cleaning product will be used by the individual,
permit water to flow through the ingress interface into the mixing chamber,
driving the series of dispensing elements such that appropriate amounts of at least some of the ingredients are dispensed into the mixing chamber, thereby combining with the water to form a mixture,
cause the mixture to be jostled by the pneumatic mixer, and
cause the mixture to be dispensed through the egress interface into the container.

14. A system designed to produce and then dispense cleaning products, the system comprising:
a structural body that includes—
an ingress interface through which water can be obtained, and
an egress interface through which cleaning products can be discharged,
wherein the egress interface is located in a cavity in which containers are placed for filling with cleaning products;
a pressure sensor that is located in the cavity beneath the egress interface, so as to generate an output that indicates whether a container is presently located in the cavity
a series of reservoirs in which ingredients are stored;
a series of dispensing elements that, when activated, controllably dispense the ingredients from the series of reservoirs;
a mixing chamber that includes a mixing implement and is fluidly connected to the ingress interface, the egress interface, and the series of dispensing elements; and
a processor configured to:
receive input indicative of an instruction to produce a cleaning product,
select a formula that is associated with the cleaning product from among a series of formulas stored in a memory,
wherein each formula of the series of formulas is associated with a different cleaning product,
determine, based on an analysis of the output generated by the pressure sensor, that a container is presently located in the cavity, and
in response to determining that the container is presently located in the cavity,
cause the cleaning product to be produced in accordance with the formula by—
permitting water to flow through the ingress interface into the mixing chamber,
driving the series of dispensing elements that that appropriate amounts of at least some of the ingredients are dispensed into the mixing chamber, thereby combining with the water to form a mixture,
causing the mixture to be mixed by the mixing implement, and
causing the mixture to be dispensed through the egress interface into the container.

15. The system of claim 14, wherein each formula of the series of formulas is associated with different amounts or different combinations of the ingredients.

16. The system of claim 14, further comprising:
a printer configured to output a label for the cleaning product that specifies
(i) the at least some of the ingredients,
(ii) an identifier associated with the formula,
(iii) dosing instructions,
(iv) storage instructions,
(v) poison control warnings, or (vi) a machine-readable code that is identifiable upon purchase of the cleaning product.

17. The system of claim 14, further comprising:

a heating element that, when activated, heats the mixture in the mixing chamber.

18. The system of claim 14, wherein the ingredients are stored in the series of reservoirs in powder form.

19. The system of claim 14, wherein the ingredients are stored in the series of reservoirs in liquid form.

20. The system of claim 14, wherein the processor is further configured to:

receive second input indicative of a request from a user to customize the formula, and customize the formula to personalize the cleaning product based on a characteristic or a preference of the user.

* * * * *